United States Patent
Lin et al.

(10) Patent No.: US 10,153,035 B2
(45) Date of Patent: Dec. 11, 2018

(54) SRAM-BASED AUTHENTICATION CIRCUIT

(71) Applicant: Taiwan Semiconductor Manufacturing Co., Ltd., Hsin-Chu (TW)

(72) Inventors: Chien-Chen Lin, Kaohsiung (TW); Wei Min Chan, Sindian (TW); Chih-Yu Lin, Taichung (TW); Shih-Lien Linus Lu, Hsinchu (TW); Yen-Huei Chen, Hsinchu County (TW)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 89 days.

(21) Appl. No.: 15/288,342

(22) Filed: Oct. 7, 2016

(65) Prior Publication Data

US 2018/0102163 A1      Apr. 12, 2018

(51) Int. Cl.
| | | |
|---|---|---|
| *G06F 21/00* | (2013.01) | |
| *G11C 11/419* | (2006.01) | |
| *G11C 11/418* | (2006.01) | |
| *H04L 9/32* | (2006.01) | |
| *G11C 7/20* | (2006.01) | |
| *G11C 7/24* | (2006.01) | |
| *G11C 11/413* | (2006.01) | |
| *G11C 29/44* | (2006.01) | |

(52) U.S. Cl.
CPC ............. *G11C 11/419* (2013.01); *G11C 7/20* (2013.01); *G11C 7/24* (2013.01); *G11C 11/413* (2013.01); *G11C 11/418* (2013.01); *H04L 9/3278* (2013.01); *G11C 2029/4402* (2013.01)

(58) Field of Classification Search
CPC ..... G11C 11/419; G11C 11/418; H04L 9/3278
See application file for complete search history.

(56) References Cited

U.S. PATENT DOCUMENTS

| | | |
|---|---|---|
| 8,605,523 B2 | 12/2013 | Tao et al. |
| 8,630,132 B2 | 1/2014 | Cheng et al. |
| 8,760,948 B2 | 6/2014 | Tao et al. |
| 8,908,421 B2 | 12/2014 | Liaw |
| 8,929,160 B2 | 1/2015 | Katoch et al. |
| 8,964,492 B2 | 2/2015 | Hsu et al. |
| 8,982,643 B2 | 3/2015 | Lum |
| 9,117,510 B2 | 8/2015 | Yang et al. |
| 9,208,858 B1 | 12/2015 | Lin et al. |
| 9,218,872 B1 | 12/2015 | Liaw |
| 2014/0108786 A1* | 4/2014 | Kreft .................. G06F 21/71 713/156 |
| 2014/0153345 A1 | 6/2014 | Kim et al. |
| 2014/0233330 A1 | 8/2014 | Ko et al. |

(Continued)

*Primary Examiner* — Mahfuzur Rahman
(74) *Attorney, Agent, or Firm* — Duane Morris LLP

(57) ABSTRACT

A memory device includes a memory cell array comprising a plurality of memory cells wherein each of the plurality of memory cells is configured to be in a data state, and a physically unclonable function (PUF) generator. The PUF generator further includes a first sense amplifier, coupled to the plurality of memory cells, wherein while the plurality of memory cells are being accessed, the first sense amplifier is configured to compare accessing speeds of first and second memory cells of the plurality of memory cells, and based on the comparison, provide a first output signal for generating a first PUF signature.

16 Claims, 17 Drawing Sheets

(56) References Cited

U.S. PATENT DOCUMENTS

| | | |
|---|---|---|
| 2015/0348598 A1 | 12/2015 | Wang et al. |
| 2015/0371702 A1 | 12/2015 | Wu et al. |
| 2015/0380077 A1 | 12/2015 | Wu et al. |
| 2015/0380078 A1 | 12/2015 | Liaw |
| 2016/0335200 A1* | 11/2016 | Cambou ............. G06F 12/1408 |
| 2017/0046129 A1* | 2/2017 | Cambou ................ G06F 7/582 |
| 2017/0048072 A1* | 2/2017 | Cambou ............... H04L 9/3278 |
| 2018/0052782 A1* | 2/2018 | Cambou ............. G06F 12/1408 |

* cited by examiner

SRAM-BASED AUTHENTICATION CIRCUIT

BACKGROUND

With the increasing use of electronic devices utilizing integrated circuits to provide different types of information for a variety of different applications, there has been an increasing need to adequately protect sensitive and/or critical information that may be stored within an electronic device to limit access to such information to only such other devices that have permission to access the information. Some examples of applications include the authentication of devices, protection of confidential information within a device, and securing a communication between two or more devices.

A physically unclonable function (PUF) is a physical structure generally within an integrated circuit that provides a number of corresponding outputs (e.g., responses) in response to inputs (e.g., challenges/requests) to the PUF. Each PUF provides one or more sets of request-response pairs. An identity of the integrated circuit may be established by such request-response pairs provided by the PUF. With the establishment of the identity, secure communication can be provided between devices. The PUF can also be used for existing authentication purposes to replace the current method of assigning an identity to an electronic device. Since the PUF is based on intrinsic properties of a manufacturing process, the PUF has various advantages over conventional authentication approaches that inscribe an identity on a device that may be mimicked and/or reverse engineered more easily.

BRIEF DESCRIPTION OF THE DRAWINGS

Aspects of the present disclosure are best understood from the following detailed description when read with the accompanying figures. It is noted that various features are not necessarily drawn to scale. In fact, the dimensions of the various features may be arbitrarily increased or reduced for clarity of discussion.

DETAILED DESCRIPTION OF EXEMPLARY EMBODIMENTS

Figure 1:
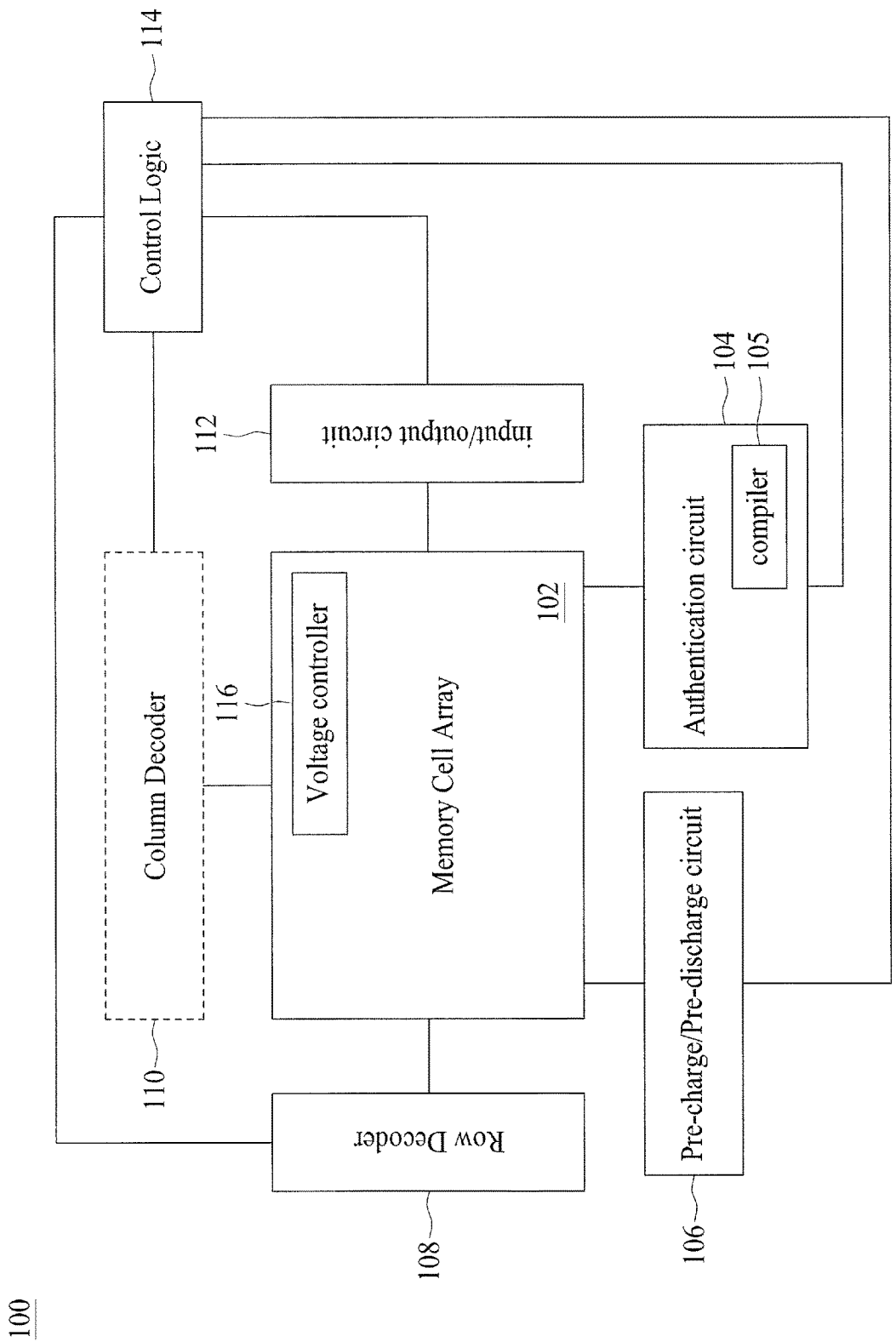
FIG. 1 illustrates an exemplary block diagram of a memory device that includes an authentication circuit, in accordance with some embodiments.

The following disclosure describes various exemplary embodiments for implementing different features of the subject matter. Specific examples of components and arrangements are described below to simplify the present disclosure. These are, of course, merely examples and are not intended to be limiting. For example, it will be understood that when an element is referred to as being "connected to" or "coupled to" another element, it may be directly connected to or coupled to the other element, or one or more intervening elements may be present.

A physical unclonable function (PUF) is generally used for authentication and secret key storage without requiring secure electrically erasable programmable read-only memory (EEPROMs) and/or other expensive hardware (e.g., battery-backed static random-access memory). Instead of storing secrets in a digital memory, the PUF derives a secret from physical characteristics of an integrated circuit (IC). The PUF is based on an idea that even though an identical manufacturing process is used to fabricate a plurality of ICs, each IC may be slightly different due to manufacturing variability. PUFs leverage this variability to derive "secret" information that is unique to each of the ICs (e.g., a silicon "biometric"). Generally, such secret information is referred to as a "signature" of the IC. In addition, due to the manufacturing variability that defines the signature, one cannot manufacture two identical ICs even with full knowledge of the IC's design. Various types of variability of an IC can be used to define such a signature such as, for example, gate delay(s), power-on state(s) of a static random-access memory (SRAM) device, and/or any of a variety of physical characteristics of an IC.

In the example of using the power-on state(s) of a static random-access memory (SRAM) device provided above, even though an SRAM device includes symmetric cells (bits), manufacturing variability may still cause each bit of the SRAM device to tend to be at a high state (i.e., a logical "1") or at a low state (i.e., a logical "0") while the SRAM device is powered on. Such initial power-on states of the bits are randomly distributed across the whole SRAM device, which gives rises to a variability that can be defined by a PUF to produce a unique signature of the SRAM device. Generally, generating a PUF signature by using the power-on state(s) of an SRAM device is referred to as a "power-on SRAM-based PUF." To generate a PUF signature using a power-on SRAM-based PUF generally uses at least one iteration of powering up and down the SRAM device, which may disadvantageously result in additional power consumption while operating the SRAM device and it may require longer time to generate the signature (e.g., a limited throughput). Still further, the power-on state of each bit of an SRAM device is typically subjected to a variety of local environment parameters such as, for example, an operation temperature of the bit, a supply voltage of the bit, a stress tolerated by the bit, an aging effect of the bit, etc. Accordingly, the power-on states of two bits located at two different locations may significantly depend on the respective local environment parameters to which the two bits are subjected. As such, the PUF signature, generated based on the power-on states of these two bits, may be less reliable. Other types of conventional PUF using the physical characteristics of an IC to generate a PUF signature may have similar issues as described above. Therefore, the conventional PUF has not been entirely satisfactory at every aspect.

Embodiments of the present disclosure provide various systems and methods to generate, at least, a bit of a PUF signature for a memory device by comparing accessing speeds (e.g., reading speeds) of two adjacent memory cells of the memory device. Since the disclosed systems and methods generate the PUF signature based on the comparison of reading speeds, no iteration to power up and down the memory device is required, which eliminates the power consumption issue the conventional power-on SRAM-based PUF is facing. Further, by comparing the reading speeds of two adjacent memory cells of the memory device (to generate the PUF signature), the PUF signature may be less subjected to the environment parameters as described above, and thus may be more reliable.

FIG. 1 illustrates a memory device 100 in accordance with various embodiments. In the illustrated embodiment of FIG. 1, the memory device 100 includes a memory cell array 102, an authentication circuit 104, a pre-charge/pre-discharge (PC/PD) circuit 106, a row decoder 108, an optional column decoder 110, an input/output (I/O) circuit 112, and a control logic 114. Further, as illustrated in FIG. 1, the memory cell array 102 includes an embedded voltage controller 116. In some embodiments, despite not being shown in FIG. 1, all of the components (i.e., 102, 104, 106, 108, 110, and 112) may be coupled to each other and to the control logic 114 such that they are controlled by the control logic 114. Although, in the illustrated embodiment of FIG. 1, each component is shown as a separate block for the purpose of clear illustration, in some other embodiments, some or all of the components shown in FIG. 1 may be integrated together. For example, the memory cell array 102 may include an embedded authentication circuit (e.g., 104).

Referring still to FIG. 1, in some embodiments, the memory cell array 102 includes a plurality of memory cells that are arranged in a column-row configuration in which each column has a bit line (BL) and a bit bar line (BBL) and each row has a word line (WL). More specifically, the BL and BBL of each column are respectively coupled to a plurality of memory cells that are disposed in that column, and each memory cell in that column is arranged on a different row and coupled to a respective (different) WL. That is, each memory cell of the memory cell array 102 is coupled to a BL of a column of the memory cell array 102, a BBL of the column of the memory cell array 102, and a WL of a row of the memory cell array 102. In some embodiments, the BL's and BBL's are arranged in parallel vertically and the WL's are arranged in parallel horizontally (i.e., perpendicular to the BL's and BBL's). In some embodiments, the authentication circuit 104 includes a plurality of sense amplifiers that are coupled to the plurality of memory cells. Each sense amplifier of the authentication circuit 104 is configured to compare reading speeds (i.e., either charging rate or discharging rate, which will be discussed further below) between two or more memory cells coupled to that sense amplifier, through each memory cell's coupled BL or BBL, so as to provide an output bit based on the comparison result.

In some embodiments, the authentication circuit 104 may further include a compiler 105 to receive the output bit of each sense amplifier and use the output bit(s) to generate a PUF signature. The PC/PD circuit 106 is also coupled to the plurality of memory cells and configured to pre-charge and/or pre-discharge the BLs and/or BBLs. The row decoder 108 is configured to receive a row address of the memory cell array and assert a WL at that row address. In some embodiments, the column decoder 110 may be optional. The column decoder 110 is configured to receive a column address of the memory cell array and assert a BL and/or BBL at that column address. The I/O circuit 112 is configured to access a data bit (i.e., a logical "1" or a logical "0") at each of the memory cells. In some embodiments, a data bit may be written to or read from a memory cell by the I/O circuit 112. As described above, in some embodiments, the control logic 114 is coupled to all the components and configured to control the coupled components. The voltage controller 116 is configured to control (e.g., increase or decrease) a voltage level of a supply voltage applied at each of the memory cells. In some alternative embodiments, the voltage controller 116 may be implemented as a separate block, which is not embedded in the memory cell array 102 as shown in FIG. 1. An illustrated embodiment of the memory cell array 102, the authentication circuit 104, and the I/O circuit 112 will be provided in further detail below with reference to FIG. 2.

Figure 2:
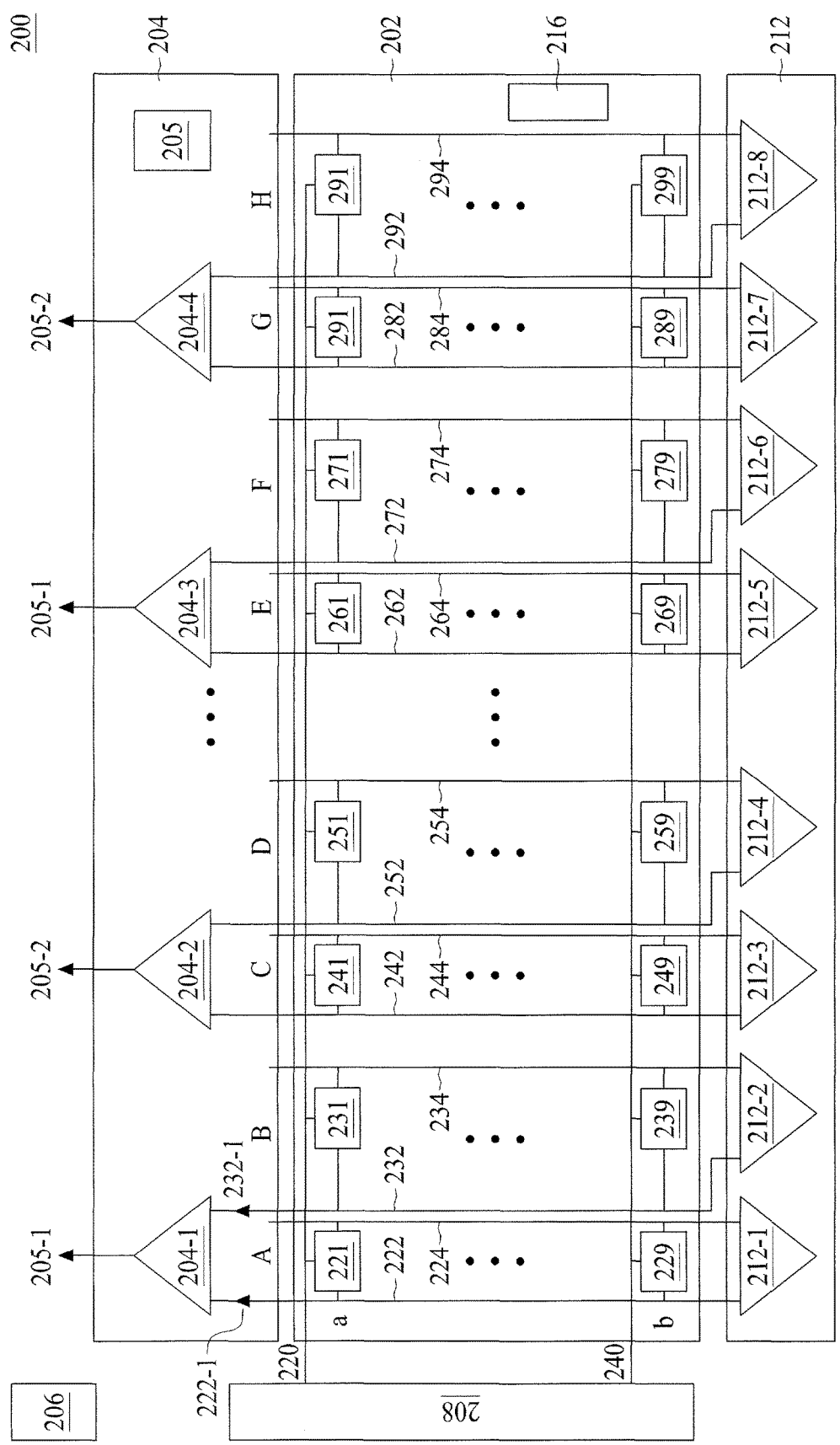
FIG. 2 illustrates an exemplary block diagram of the memory device in FIG. 1 including a schematic diagram of an authentication circuit, in accordance with some embodiments.

Referring now to FIG. 2, an embodiment of a memory device 200 is illustrated. The memory device 200 may be substantially similar to the memory device 100 and thus the memory cell array 202, the authentication circuit 204, the PC/PD circuit 206, the row decoder 208, the I/O circuit 212, the control logic 214 and voltage controller 216 may be substantially similar to the corresponding components 102, 104, 106, 108, 112, 114 and 116 of FIG. 1, respectively. Accordingly, the functionality of each component in FIG. 2 may be substantially similar to the corresponding component of FIG. 1. In some embodiments, the memory cell array 202 may be an SRAM array. However, the memory cell array 202 may be implemented as any of a variety of memory cell arrays (e.g., DRAM, MRAM, RRAM etc.) while remaining within the scope of the present disclosure. For example, the memory cell array 102/202 may be implemented as a read-only-memory (ROM) array, a logic n-type metal-oxide-semiconductor (NMOS) array, a logic p-type metal-oxide-semiconductor (PMOS) array, or a combination thereof, which will be illustrated and discussed in some further embodiments with respect to FIGS. 11, 12, and 13.

Referring still to FIG. 2, as described above, the SRAM memory cell array 202 includes a plurality of SRAM memory cells (e.g., 221, 229, 231, 239, 241, 249, 251, 259, 261, 269, 271, 279, 281, 289, 291, 299) arranged in a column-row configuration. For clarity, the SRAM memory cell is referred as "cell" hereinafter. Although the illustrated embodiment of FIG. 2 shows only 16 cells, any desired number of cells may be included in the embodiment of memory device 200 while remaining within the scope of the present disclosure. More specifically in the memory cell array 202 of FIG. 2, cells 221 and 229, and any other cells disposed therebetween are arranged in column "A". Similarly, cells 231 and 239, and any other cells disposed therebetween are arranged in column "B;" cells 241 and 249, and any other cells disposed therebetween are arranged in column "C;" cells 251 and cell 259, and any other cells disposed therebetween are arranged in column "D;" cells 261 and 269, and any other cells disposed therebetween are arranged in column "E;" cells 271 and 279, and any other cells disposed therebetween are arranged in column "F;" cells 281 and 289, and any other cells disposed therebetween are arranged in column "G;" cells 291 and 299, and any other cells disposed therebetween are arranged in column "H." Although only 8 columns are illustrated, any desired number of columns may be arranged between the columns D and E. In each column, any desired number of cells may be disposed between the illustrated cells. For example, in column A, one or more cells may be disposed between the cells 221 and 229. Still more specifically in FIG. 2, the cells in each column are each disposed in a respective row, and each row may include a plurality of cells that each belong to a respective, and different column. In the illustrated embodiment of FIG. 2, the cells 221, 231, 241, 251, 261, 271, 281, and 291 that belong to column A, B, C, D, E, F, G, and H, respectively, are disposed in a same row, hereinafter row "a." Similarly, the cells 229, 239, 249, 259, 269, 279, 289, and 299 that belong to column A, B, C, D, E, F, G, and H, respectively, are disposed in a same row, hereinafter row "b." Although only 2 rows are illustrated, any desired number of rows may be arranged between the rows a and b.

As described above, each column has a respective pair of BL and BBL that are coupled to the cells in that column, and each row has a respective WL that is coupled to multiple cells that respectively belong to multiple columns For example, as illustrated in the SRAM cell array 202 of FIG. 2, column A has BL 222 and BBL 224; column B has BL 232 and BBL 234; column C has BL 242 and BBL 244; column D has BL 252 and BBL 254; column E has BL 262 and BBL 264; column F has BL 272 and BBL 274; column G has BL 282 and BBL 284; column H has BL 292 and BBL 294. The cells of each column are coupled to the column's BL and BBL. For example, in FIG. 2, the cells 221 and 229, and any cells coupled therebetween are each coupled to the BL 222 and BBL 224; the cells 231 and 239, and any cells coupled therebetween are each coupled to the BL 232 and BBL 234; the cells 241 and 249, and any cells coupled therebetween are each coupled to the BL 242 and BBL 244; the cells 251 and 259, and any cells coupled therebetween are each coupled to the BL 252 and BBL 254; the cells 261 and 269, and any cells coupled therebetween are each coupled to the BL 262 and BBL 264; the cells 281 and 289, and any cells coupled therebetween are each coupled to the BL 282 and BBL 284; the cells 291 and 299, and any cells coupled therebetween are each coupled to the BL 292 and BBL 294. Further in FIG. 2, the cells 221, 231, 241, 251, 261, 271, 281, and up to 291 arranged in the row a are each coupled to the WL 220 of row a; and the cells 229, 239, 249, 259, 269, 279, 289, and up to 299 arranged in the row b are each coupled to the WL 240 of row b.

Referring still to FIG. 2, the authentication circuit 204 includes sense amplifiers 204-1, 204-2, 204-3, and up to 204-4 wherein each sense amplifier of the authentication circuit 204 is coupled to two BL's that respectively belong to two adjacent columns. For example, as shown in the illustrated embodiment of FIG. 2, the sense amplifier 204-1 is coupled to the BL's 222 and 232; the sense amplifier 204-2 is coupled to the BL's 242 and 252; the sense amplifier 204-3 is coupled to the BL's 262 and 272; and the sense amplifier 204-4 is coupled to the BL's 282 and 292. Although, as shown in FIG. 2, each of the sense amplifiers of the authentication circuit 204 is coupled to two BL's that respectively belong to two adjacent columns, in some other embodiments, each of the sense amplifiers of the authentication circuit 204 may be coupled to two BBL's that respectively belong to two adjacent columns (e.g., the sense amplifier 204-1 is coupled to the BBL's 224 and 234). In some embodiments, each of the sense amplifiers of the authentication circuit 204 is configured to receive first and second input signals through the coupled BL's that belong to two adjacent columns, respectively, and compare the first and second input signals so as to provide an output signal. More specifically, the first and second input signals are provided by two cells that are on a same row and respectively belong to the two adjacent columns while these two cells are being accessed (e.g., read). For example, a pair of first and second input signals for the sense amplifier 204-1 may be generated while the cells 221 and 231 are being accessed; another pair of first and second input signals for the sense amplifier 204-1 may be generated while the cells 229 and 239 are being accessed. In some embodiments, such first and second input signals may each include either a discharging rate or a charging rate (i.e., a reading speed) of a coupled cell. Accordingly, an output signal is generated based on a comparison of the reading speeds, and such an output signal may be used by the compiler 205 of the authentication circuit 204 to generate, at least part of, a PUF signature. In an example, the sense amplifier 204-1 is configured to receive the first reading speed (the signal 222-1) from the cell 221 along the BL 222 and the second reading speed (the signal 232-1) from the cell 231 along the BL 232, respectively, and compare the signals 222-1 and 232-1 so as to provide an output signal 205-1.

Referring still to FIG. 2, the PC/PD circuit 206 is coupled to all the BL's and BBL's of the SRAM cell array 202. In some embodiments, the PC/PD circuit 206 is configured to pre-charge and/or pre-discharge the BL and/or BBL coupled to a cell of the SRAM cell array 202 before a data bit (i.e., a logical 1 or 0) stored in the cell is read through the coupled BL and/or the BBL. As a representative example, before a bit data stored in the cell 221 is read, the PC/PD circuit 206 is configured to pre-charge the BL 222 and BBL 224 coupled to the cell 221. The row decoder 208 is coupled to all the WL's of the SRAM cell array 202. In some embodiments, the row decoder 208 is configured to receive a row address (as described above) and, based on the row address, to assert the WL at the row address so as to activate one or more access transistors coupled to the WL. The I/O circuit 212 includes another plurality of sense amplifiers 212-1, 212-2, 212-3, 212-4, 212-5, 212-6, and up to 212-8. Different from the sense amplifier of the authentication circuit 204, each of the sense amplifiers of the I/O circuit 212 is coupled to the BL and BBL of one single column. For example, the sense amplifier 212-1 is coupled to the BL 222 and BBL 224 of column A; the sense amplifier 212-2 is coupled to the BL 232 and BBL 234 of column B; the sense amplifier 212-3 is coupled to the BL 242 and BBL 244 of column C; the sense amplifier 212-4 is coupled to the BL 252 and BBL 254 of column D; the sense amplifier 212-5 is coupled to the BL 262 and BBL 264 of column E; the sense amplifier 212-6 is coupled to the BL 272 and BBL 274 of column F; the sense amplifier 212-7 is coupled to the BL 282 and BBL 284 of column G; and the sense amplifier 212-8 is coupled to the BL 292 and BBL 294 of column H. Operatively, such sense amplifiers of the I/O circuit 212 are each configured to compare a voltage difference between the coupled BL and BBL to which a cell is coupled so as to read bit data stored in that cell. As a representative example, if the bit data stored in the cell 221 is a logical 1, the sense amplifier 212-1 may read a logical 1 based on the comparison of the voltage difference between the coupled BL 222 and BBL 224. Details of the operations of the memory device 200 and the associated components/signals will be discussed further below with reference to FIG. 3.

Figure 3:
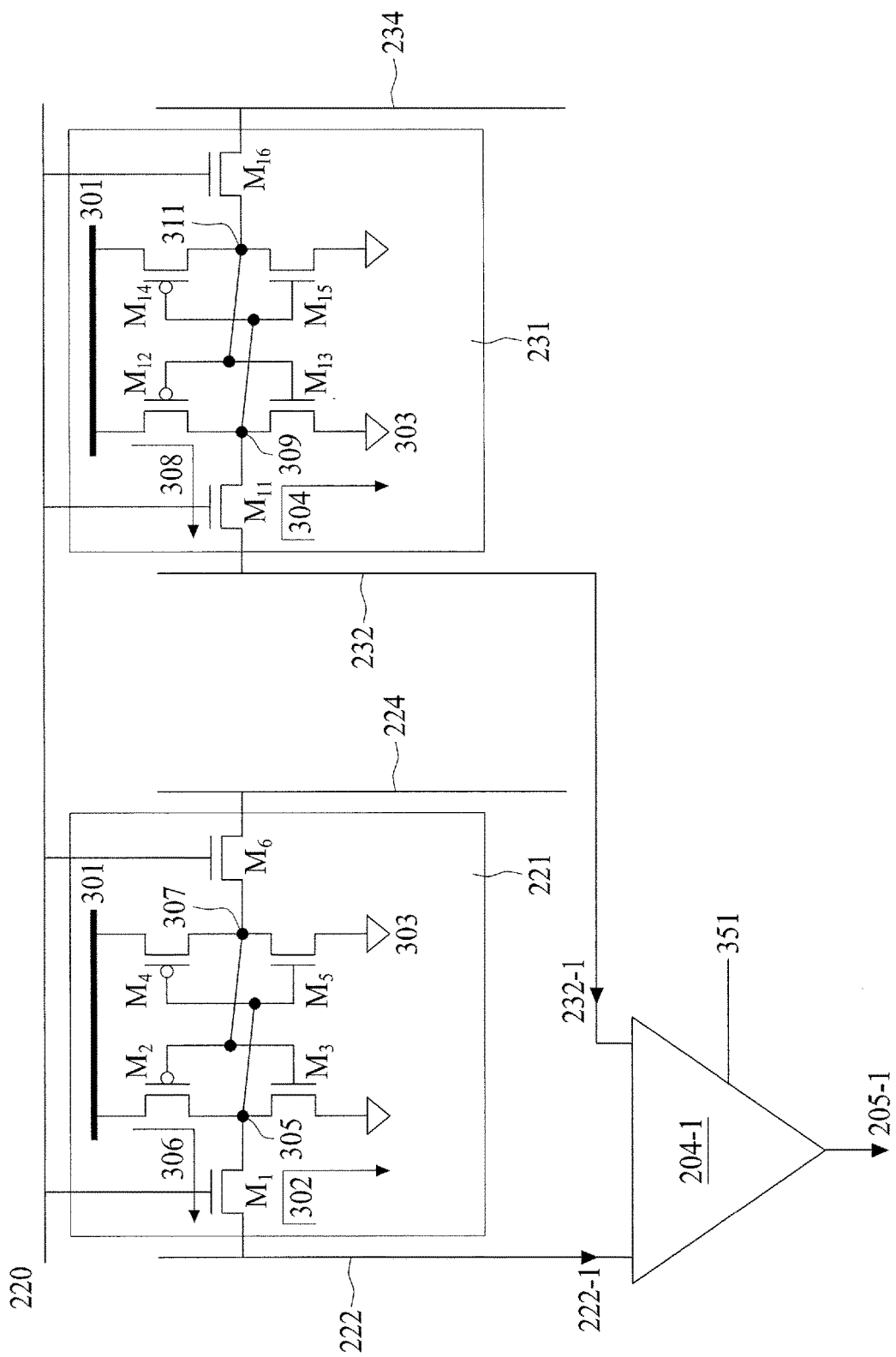
FIG. 3 illustrates an exemplary circuitry diagram of two adjacent memory cells of the SRAM cell array and a sense amplifier of the authentication circuit of FIG. 2, in accordance with some embodiments.

FIG. 3 illustrates an exemplary SRAM circuit showing details of two adjacent cells 221 and 231, and their coupled sense amplifier 204-1 of the authentication circuit 204, in accordance with various embodiments. The illustrated embodiment of FIG. 3 will be discussed in conjunction with FIG. 2. As shown in FIG. 3, although the cells 221 and 231 are each implemented as a 6-transistor SRAM (6T-SRAM) cell, the cell (e.g., 221, 231, etc.) of the SRAM cell array 202 is not limited to being implemented as a 6T-SRAM cell. The cell of the SRAM cell array 202 may be implemented as any of a variety of SRAM cells such as, for example, 2T-2R SRAM cell, 4T-SRAM cell, 8T-SRAM cell, etc.

Referring still to FIG. 3, cell 221 includes transistors: M1, M2, M3, M4, M5, and M6; and cell 231 includes transistors: M11, M12, M13, M14, M15, and M16. In some embodiments, the cells 221 and 231 are substantially similar to each other, that is, transistor M1 is substantially similar to transistor M11; transistor M2 is substantially similar to transistor M12; transistor M3 is substantially similar to transistor M13; transistor M4 is substantially similar to transistor M14; transistor M5 is substantially similar to transistor M15; and transistor M6 is substantially similar to transistor M16. Thus, for clarity, the following discussions of configurations and operations of the transistors of the cell will be directed to the cell 221 only.

As illustrated in FIG. 3, the transistor M2 and M3 are formed as a first inverter and the transistors M4 and M5 are formed as a second inverter wherein the first and second inverters are coupled to each other. More specifically, the first and second inverters are each coupled between first voltage reference 301 and second voltage reference 303. Generally, the first voltage reference 301 is a voltage level of a supply voltage applied on the cell 221. The first voltage reference 301 is typically referred to as "Vdd." The second voltage reference 303 is typically referred to as "ground." In some embodiments, the voltage level of Vdd is determined by the control logic 214 and controlled by the voltage controller 216. For example, the voltage level may range from about 30% of Vdd to about 130% of Vdd. Further, the first inverter is coupled to the transistor M1, and the second inverter is coupled to the transistor M6. In addition to being coupled to the inverters, the transistors M1 and M6 are both coupled to the WL 220 and each coupled to the BL 222 and BBL 224, respectively. The transistors M1 and M6 are typically referred to as access transistors of the cell 221. In some embodiments, the transistors M1, M3, M5, and M6 each includes an NMOS transistor, and M2 and M4 each includes a PMOS transistor. Although the illustrated embodiments of FIG. 3 shows that M1-M6, and MU-M16 are either NMOS or PMOS transistors, any of a variety of transistors or devices that are suitable for use in a memory device may be implemented as at least one of M1-M6, and M11-M16 such as, for example, BJT, HEMT, etc.

In general, when an SRAM cell stores a data bit, a first node of the SRAM cell is configured to be at a first logical state (1 or 0), and a second node of the SRAM cell is configured to be at a second logical state (0 or 1), wherein the first and second logical states are complementary with each other. In some embodiments, the first logical state at the first node is the data bit stored by the SRAM cell. For example, the illustrated embodiment of FIG. 3 includes nodes 305 and 307. When the cell 221 stores a data bit (e.g., a logical 1), the node 305 is configured to be at the logical 1 state, and the node 307 is configured to be at the logical 0 state.

To cause the authentication circuit 204 to generate a PUF signature, in some embodiments, initially, a data bit (e.g., either a logical 1 or 0) is written to each of the cells in the SRAM cell array 202 to be read. In some embodiments, such an operation (write) may be performed by the I/O circuit 212. More specifically, the I/O circuit 212 may include further components (e.g., one or more sense amplifiers) to perform the write operation(s). Subsequently, the row decoder 208 receives a row address to locate (determine) a WL at that row address and then the WL is asserted by the row decoder 208. In some embodiments, such a row address may be provided by the control logic 214. In response to the WL being asserted (e.g., 220), the access transistors (e.g., M1, M6, M11, M16), disposed along and coupled to the WL, are activated (i.e., turned on). According to some embodiments of the present disclosure, all or part of the BL's and BBL's (e.g., 222, 224, 232, and 234) of the cell array 202 are either pre-charged to Vdd or pre-discharged to ground by the PC/PD circuit 206. Then the data bit stored (being written) in each cell (e.g., 221 . . . etc.) of the row (i.e., along the asserted WL) is read through the cell's respectively coupled BL (e.g., 222) and BBL (e.g., 224) by a corresponding sense amplifier (e.g., 212-1) of the I/O circuit 212. While the data bits are being read, in some embodiments, after a certain period of time ("$T_{enab}$"), each of the sense amplifiers (e.g., 204-1) of the authentication circuit 204 coupled to the BL's (or BBL's) of two adjacent columns/cells (e.g., 221 and 231) at that row starts to compare reading speeds (i.e., either the charging rates or the discharging rates) of the two adjacent cells along the coupled BL's (or BBL's). That is, the sense amplifier of the authentication circuit 204 starts to compare reading speeds (either discharging rate or charging rate) of the two adjacent cells at the same row. In response to the comparison, each of the sense amplifiers of the authentication circuit 204 may generate a bit (e.g., 205-1) for a PUF signature. As such, for a particular row (WL) being asserted, a first plurality of bits (e.g., 205-1, 205-2, 205-3 . . . 205-4) of the PUF signature may be (simultaneously) generated by the sense amplifiers of the authentication circuit 204. In some embodiments, each of the other rows (WL's) in the memory cell array is subsequently asserted. Accordingly, one or more pluralities of bits of the PUF signature may be generated by the sense amplifiers of the authentication circuit 204. As such, when a memory cell array includes $N^2$ cells (N columns×N rows) and each sense amplifier of the authentication circuit is coupled to two adjacent BL's (i.e., two adjacent columns) of the memory cell array, as illustrated in FIG. 2, a generated PUF signature may include $\frac{1}{2}N^2$ bits while logical states (either 1 or 0) of the data bits are being read.

As described above, the sense amplifier 201-4 is configured to receive input signals 222-1 and 232-1 from the cell 221 along the BL 222 and from the cell 231 along the BL 232, respectively, to generate the output signal 205-1. In some embodiments, the input signal 222-1 may be a voltage level present on the BL 222 at a particular time; the input signal 232-1 may be a voltage level present on the BL 232 at that particular time. Additionally, in some embodiments, the sense amplifier 204-1 is configured to receive an enablement signal 351 (from the control logic 114). Such an enablement signal is triggered (i.e., either from low to high or high to low) after the predefined period of time $T_{enab}$, as mentioned above. The predefined period of time $T_{enab}$ may be derived based on a simulation (e.g., a Monte Carlo Simulation) on the memory device 200 so as to allow the sense amplifier 204-1 to be able to detect a presence of a difference between the voltage levels on the BL's 222 and 232, which will be discussed in further detail below with reference to FIG. 4A. Upon the enablement signal being triggered, the sense amplifier 204-1 is configured to start comparing the input signals 222-1 and 232-1 (i.e., comparing the voltage levels on the BL's 222 and 232) over time which will be discussed in further detail below. In some embodiments, in response to a voltage level difference between the BL's 222 and 232 exceeding a predefined threshold (e.g., 50 mV) at a particular time (i.e., a discharging rate or a charging rate being determined), the sense amplifier 204-1 is configured to generate the output signal 205-1 as a logical 1, and in response to the voltage level difference between the BL's 222 and 232 not exceeding the predefined threshold, the sense amplifier 204-1 is configured to generate the output signal 205-1 as a logical 0. Details of how the discharging and charging rates are determined will be discussed further with respect to FIG. 4A. In some embodiments, the sense amplifier 204-1 may continue comparing the voltage levels on the BL's 222 and 232 over time until the BL's 222 and 232 are fully discharged to ground or fully charged to Vdd, or until the voltage level difference between the BL's 222 and 232 exceeds the predefined threshold.

Referring still to FIG. 3 and in conjunction with FIG. 2, in some embodiments, the control logic 214 may decide whether to write either a logical 1 or a logical 0 (through the I/O circuit 212) to all of the plurality of cells (e.g., 221, 231, 234, 251, 261, 271, 281, 291, 229, 239, 249, 259, 269, 279, 289, 299, etc.) of the SRAM cell array 202. Such a written logical 1 or 0 may be stored in each of the cell as a data bit. As described above, the data bit may be stored in the first node of each cell (e.g., 302 of cell 221, 306 of cell 231), and a complementary data bit (opposite to the logical state of the data bit) may be stored in the second node of the cell (e.g., 304 of cell 221, 308 of cell 231).

In some embodiments, if the data bit stored (being written) in each of the plurality of cells is a logical 0, the nodes 302 and 306 of the cells 221 and 231 are respectively at a logical 0 state, the nodes 304 and 308 of the cells 221 and 231 are respectively at a logical 1 state, and the control logic 231 may be configured to cause the PC/PD circuit 106 to "pre-charge" all or a subset of the BL's and BBL's (222, 224, 232, and 234) to Vdd. Prior to, simultaneously with, or subsequent to the pre-charging, the control logic 214 may cause the row decoder 208 to assert a WL of a row (e.g., the WL 220 in the example of FIG. 3) so as to activate (turn on) all the access transistors (e.g., M1, M6, M11, and M16). In some embodiments, the voltage level of the voltage reference 301 may be lower than Vdd such as, for example, between about 50% of Vdd and about 99% of Vdd. In response to the access transistors M1 and M11 being turned on, since the BL's 222 and 232 are pre-charged to Vdd and the nodes 302 and 306 are at the logical 0 state (e.g., ground), a discharging path 302 may be formed from the BL 222, through the access transistor M1 and the transistor M3 in the cell 221, and to ground, and a discharging path 304 may be formed from the BL 232, through the access transistor M11 and the transistor M13 in the cell 231 and to ground, respectively. Due to a variety of manufacturing variations, each transistor in the memory cell array may not be exactly the same. In other words, each transistor has a plurality of distinct characteristics such as, for example, a distinct threshold voltage, a distinct mobility, a distinct on/off ratio, a distinct sub-threshold slope, etc. As such, in some embodiments, the discharging paths 302 of the cell 221 and 304 of the cell 231 may each have a discharging rate, and these two discharging rates may be different from each other. For example, the discharging rate of the discharging path 302 of the cell 221 can be faster/slower than the discharging rate of the discharging path 304 of the cell 231. Using such a difference of the discharging rates between two adjacent cells, a bit (e.g., 205-1) of a PUF signature may be generated by the sense amplifier 204-1. For example, the sense amplifier 204-1 compares the discharging rates of the cells 221 and 231. Based on the comparison, if the difference of these two discharging rates is higher than a predefined threshold (e.g., 50 mV/sec), the sense amplifier 204-1 may provide the output signal 205-1 as a logical 1; if the difference of the two discharging rates is lower than the predefined threshold, the sense amplifier 204-1 may provide the output signal 205-1 as a logical 0. Details of the discharging rate will be discussed below with reference to FIG. 4A.

Referring again to FIG. 2, in some embodiments, one or more output signals (bits) may be respectively provided by other sense amplifiers (e.g., 204-2, 204-3, 204-4, etc.) at the same row as the sense amplifier 204-1 of the authentication circuit 204, based on comparing discharging rates of each respective sense amplifier's coupled "discharging paths." For example, the sense amplifier 204-2 compares the discharging rates of the discharging paths formed through the transistor of the cells 241 and 251, respectively, and outputs the output bit 205-2 based on the comparison; the sense amplifier 204-4 compares the discharging rates of the discharging paths formed through the transistor of the cells 261 and 271, respectively, and outputs the output bit 205-3 based on the comparison; the sense amplifier 204-4 compares the discharging rates of the discharging paths formed through the transistor of the cells 281 and 291, respectively, and outputs the output bit 205-4 based on the comparison. In some embodiments, the output bits 205-1, 205-2, 205-3, and 205-4 may constitute a PUF signature (e.g., 0100). In other embodiments, the output bits 205-1, 205-2, 205-3, and 205-4 may be further processed (e.g., selected or filtered) by compiler 205 to generate a PUF signature. Yet in some other embodiments, the output bits 205-1, 205-2, 205-3, and 205-4 generated based on the comparisons of discharging rates of two adjacent cells at a first row (e.g., row a) may be further processed, together with the output bits 205-1, 205-2, 205-3, and 205-4 generated based on the comparisons of discharging rates of two adjacent cells at a second row (e.g., row b), by the compiler 205 to generate a PUF signature.

Figure 4A:
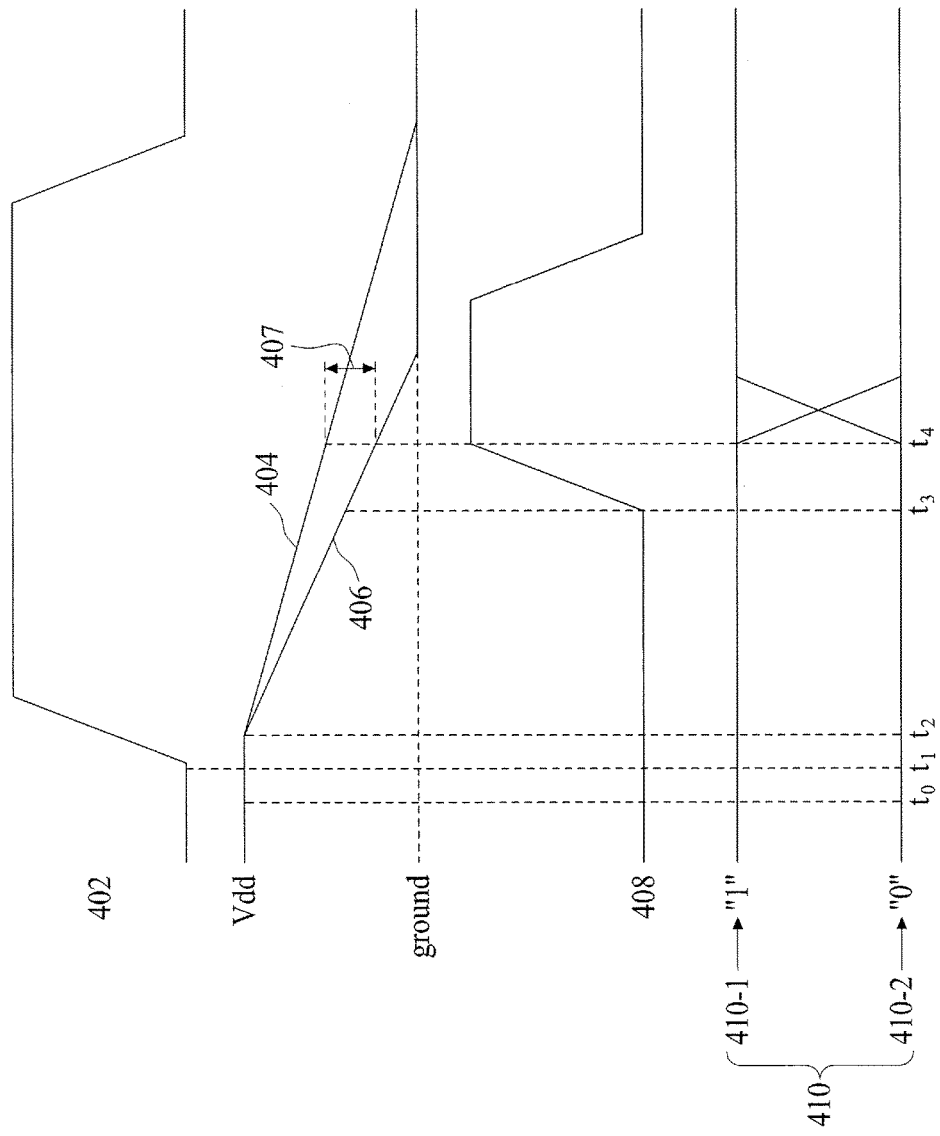
FIG. 4A is an exemplary diagram illustrating waveforms of signals of the memory cells and the sense amplifier of FIG. 3, in accordance with some embodiments.

FIG. 4A illustrates exemplary waveforms 402, 404, 406, and 410 of signals on the WL 220, the discharging path 302, discharging path 304, and the output signal 205-1, respectively, and waveform 408 of the enablement signal 351, in accordance with various embodiments. More particularly, during a certain period of time while the memory device 200 (FIG. 2) is operating, waveform 402 may represent the signal over time on the WL 220; waveform 404 may represent the signal (voltage level) over time on the discharging path 302; waveform 406 may represent the signal (voltage level) over time on the discharging path 304; waveform 408 may represent the enablement signal 351 over time; waveform 410 may represent the output signal 205-1 over time. As illustrated in the embodiment of FIG. 4A, at "t0," the BL's 222 and 232 are pre-charged to Vdd. At "t1," the WL 220 is asserted by the row decoder 208 (FIG. 2) and accordingly starts to transition from a logical low to a logical high. At "t2," while the cells 221 and 231 are being accessed (read) by the respective sense amplifiers 212-1 and 212-2 of the I/O circuit 212, the discharging paths 302 and 304, as described above, are formed, respectively. Accordingly, the voltage levels on the BL's 222 and 232 start to ramp down from Vdd. As described above, each discharging path is formed by one or more transistors that are intrinsically and/or extrinsically different from one another (due to manufacturing variance) such that each discharging path may have a distinct discharging rate. As shown in FIG. 4A, the waveforms 404 and 406 each has a respective slope (i.e., a respective discharging rate).

Referring still to FIG. 4A, at "t3," the enablement signal 351 (i.e., the waveform 408) is triggered from a low state to a high state. In other embodiments, the enablement signal may be triggered from a high state to a low state. Upon the enablement signal 351 being triggered (i.e., at t3), in some embodiments, the sense amplifier 204-1 starts to detect the difference of the discharging rates of the discharging paths 302 and 304 (through the BL's 222 and 232). More specifically, after t3, every certain period of time (e.g., 100 picoseconds (ps)), the sense amplifier 204-1 retrieves the voltage levels on the discharging paths 302 and 304, and calculates the discharging rates of the discharging paths 302 and 304, respectively, through dividing the voltage levels by the period of time (100 ps in this example). As such, the discharging rates of the discharging paths 302 and 304 may be available to the sense amplifier 204-1. For example, at "t3+100 ps," the voltage level on the discharging path 302 is X volts, and at "t3+200 ps," the voltage level on the discharging path 302 is Y volts, the discharging rate of the discharging path 302 may be derived, by the sense amplifier 204-1, as (X−Y)/10 (V/ps). As described above, a timing of t3 (i.e., $T_{enab}$) is a predefined value that is derived based on a simulation of the memory device 200. In some embodiments, the timing of t3 is chosen to enable the sense amplifier 240-1 to detect a presence of a voltage difference on the discharging paths 302 and 304 such as, for example, 10 mV, before the voltages on discharging paths 302 and 304 are fully discharged. At "t4," once the sense amplifier 204-1 detects the voltage difference 407 on the discharging paths 302 and 304 exceeds a predefined threshold, the sense amplifier 204-1 may provide the output signal as a logical 0 (410-1) or a logical 1 (410-2).

Referring back to FIG. 3 (in conjunction with FIG. 2), in some embodiments, if the data bit stored (being written) in each of the plurality of cells is a logical 1, the nodes 302 and 306 of the cells 221 and 231 are respectively at a logical 1 state (the nodes 304 and 308 of the cells 221 and 231 are respectively at a logical 0 state), and, further, the control logic may be configured to cause the PC/PD circuit 106 to "pre-discharge" all the BL's and BBL's (222, 224, 232, and 234) to ground. Prior to, simultaneously with, or subsequent to the pre-discharging, the control logic 214 may cause the row decoder 208 to assert a WL of a row (the WL 220 in the example of FIG. 3) so as to activate (turn on) all the access transistors (e.g., M1, M6, M11, and M16). In some embodiments, the voltage level of the voltage reference 301 may be lower than Vdd such as, for example, between about 50% of Vdd and about 99% of Vdd. In response to the access transistors M1 and M11 being turned on, since the BL's 222 and 232 are pre-discharged to ground and the nodes 302 and 306 are at the logical 1 state (e.g., Vdd), a charging path 306 may be formed through the supply voltage 301, the transistor M2, and the access transistor M1 in the cell 221, and a charging path 308 may be formed through the supply voltage 301, the transistor M12, and the access transistor M11 in the cell 231, respectively. Similar to the discharging path, each charging path may have a charging rate due to the manufacturing variance on the transistors that constitute the charging path. Since the charging path is substantially similar to the discharging path, for clarity, further discussions of the charging path (and charging rate) and using the charging rate to provide a PUF signature will be omitted.

Figure 4B:
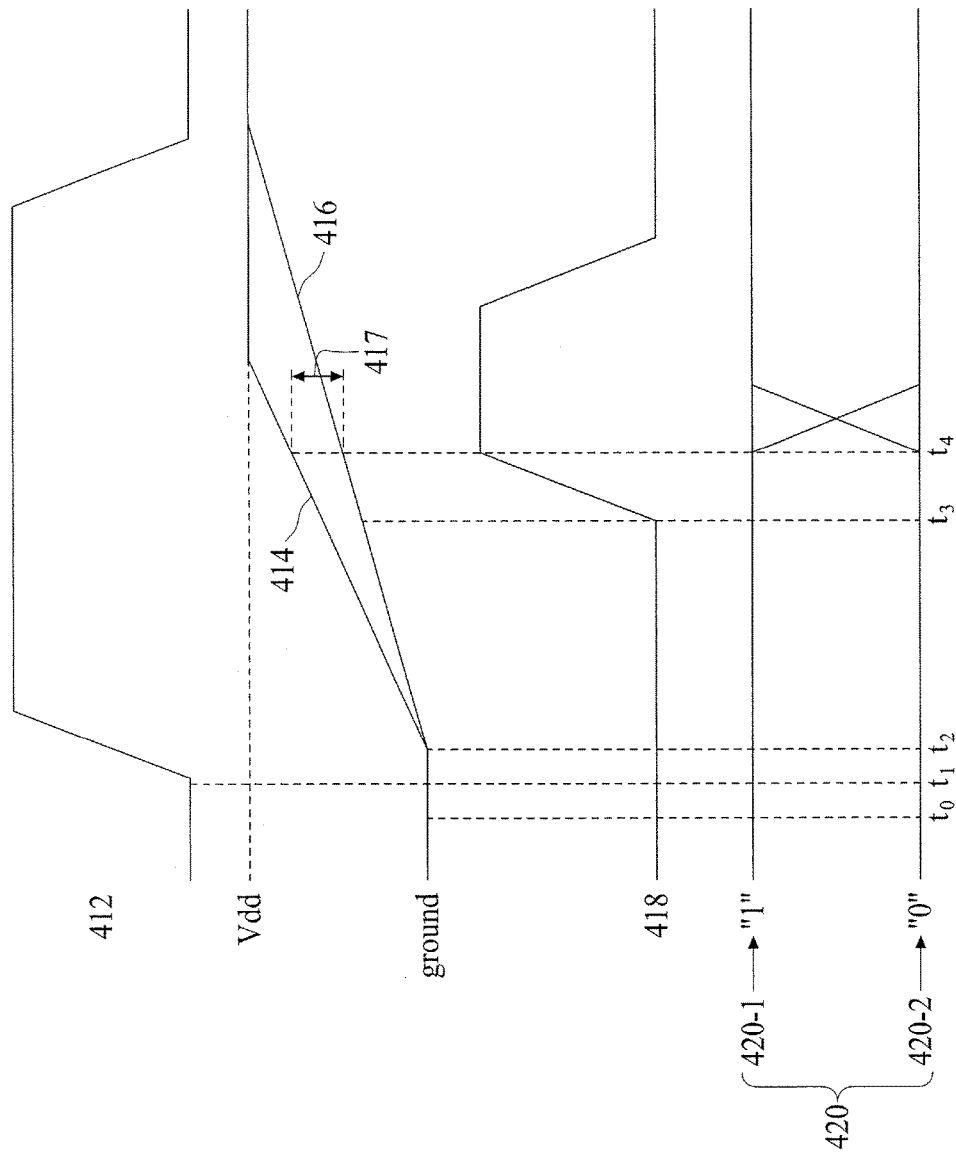
FIG. 4B is another exemplary diagram illustrating waveforms of signals of the memory cells and the sense amplifier of FIG. 3, in accordance with some embodiments.

FIG. 4B illustrates exemplary waveforms 412, 414, 416, and 418 of signals on the WL 220, the charging path 306, the charging path 308, and the output signal 205-1, respectively, and waveform 420 of the enablement signal 351, in accordance with various embodiments. More particularly, during a certain period of time while the memory device 200 (FIG. 2) is operating, waveform 412 may represent the signal over time on the WL 220; waveform 414 may represent the signal (voltage level) over time on the charging path 306; waveform 416 may represent the signal (voltage level) over time on the charging path 308; waveform 418 may represent the enablement signal 351 over time; and waveform 420 may represent the output signal 205-1 over time.

As illustrated in the embodiment of FIG. 4B, at "t0," the BL's 222 and 232 are pre-discharged to ground. At "t1," the WL 220 is asserted by the row decoder 208 (FIG. 2) and accordingly the waveform 412 starts to transition from a logical low to a logical high. At "t2," while the cells 221 and 231 are being accessed (read) by the respective sense amplifiers 212-1 and 212-2 of the I/O circuit 212, the charging paths 306 and 308, as described above, are formed, respectively. Accordingly, the voltage levels on the BL's 222 and 232 start to ramp up from ground. As described above, each charging path is formed by one or more transistors that are intrinsically and/or extrinsically different from one another (due to manufacturing variance) such that each charging path may have a distinct charging rate. As shown in FIG. 4B, the waveforms 414 and 416 each has a respective slope (i.e., a respective charging rate).

Referring still to FIG. 4B, at "t3," the enablement signal 351 (i.e., the waveform 418) is triggered from a low state to a high state. In other embodiments, the enablement signal 351 may be triggered from a high state to a low state. Upon the enablement signal 351 being triggered (i.e., at t3), in some embodiments, the sense amplifier 204-1 starts to detect the difference of the charging rates of the discharging paths 306 and 308 (through the BL's 222 and 232). More specifically, after t3, every certain period of time (e.g., 100 picoseconds (ps)), the sense amplifier 204-1 retrieves the voltage levels on the charging paths 306 and 308, and calculates the charging rates of the charging paths 306 and 308, respectively, through dividing the voltage levels by the period of time (10 ms in this example). As such, the charging rates of the charging paths 306 and 308 may be available to the sense amplifier 204-1. For example, at "t3+100 ps," the voltage level on the charging path 306 is X volts, and at "t3+200 ps," the voltage level on the charging path 306 is Y volts, the charging rate of the charging path 306 may be derived, by the sense amplifier 204-1, as (X−Y)/10 (V/ps). As described above, a timing of t3 (i.e., $T_{enab}$) is a predefined value that is derived based on a simulation of the memory device 200. In some embodiments, the timing of t3 is chosen to enable the sense amplifier 240-1 to detect a presence of a voltage difference on the charging paths 306 and 308 such as, for example, 10 mV, before the voltages on charging paths 306 and 308 are fully charged. At "t4," once the sense amplifier 204-1 detects the voltage difference 417 on the charging paths 306 and 308 exceeds a predefined threshold, the sense amplifier 204-1 may provide the output signal as a logical 0 (420-1) or a logical 1 (420-2).

In some alternative embodiments, the sense amplifier 204-1 may compare discharging rates and charging rates in sequence so as to generate two output bits for a PUF signature. Different from the embodiments discussed above in which either discharging rates or charging rates for two adjacent cells are compared to generate a bit of a PUF signature, this alternative embodiment may first compare discharging/charging rates of two adjacent cells to generate a first bit of a PUF signature, and then compare charging/discharging rates of those two adjacent cells to generate a second bit of that PUF signature. More specifically, referring to FIG. 3 and FIG. 4A, in the example in which the data bits stored at the cells 221 and 231 are logical 0's, the PC/DC circuit 206 may first pre-charge the BL's 222 and 232 so as to allow the sense amplifier 204-1 to compare the discharging rates of the cells 221 and 231 (i.e., the discharging rates of the discharging paths 302 and 304) to generate a first output bit for a PUF signature, as described above. In some embodiments, subsequently, the control logic 214 may cause the PC/DC circuit 206 to pre-discharge the BL's 222 and 232. As such, two charging paths (e.g., 306 and 308) may be formed in the cells 221 and 231, respectively, which allows the sense amplifier 204-1 to compare the charging rates of the cells 221 and 231 so as to generate a second bit for the PUF signature.

Figure 5:
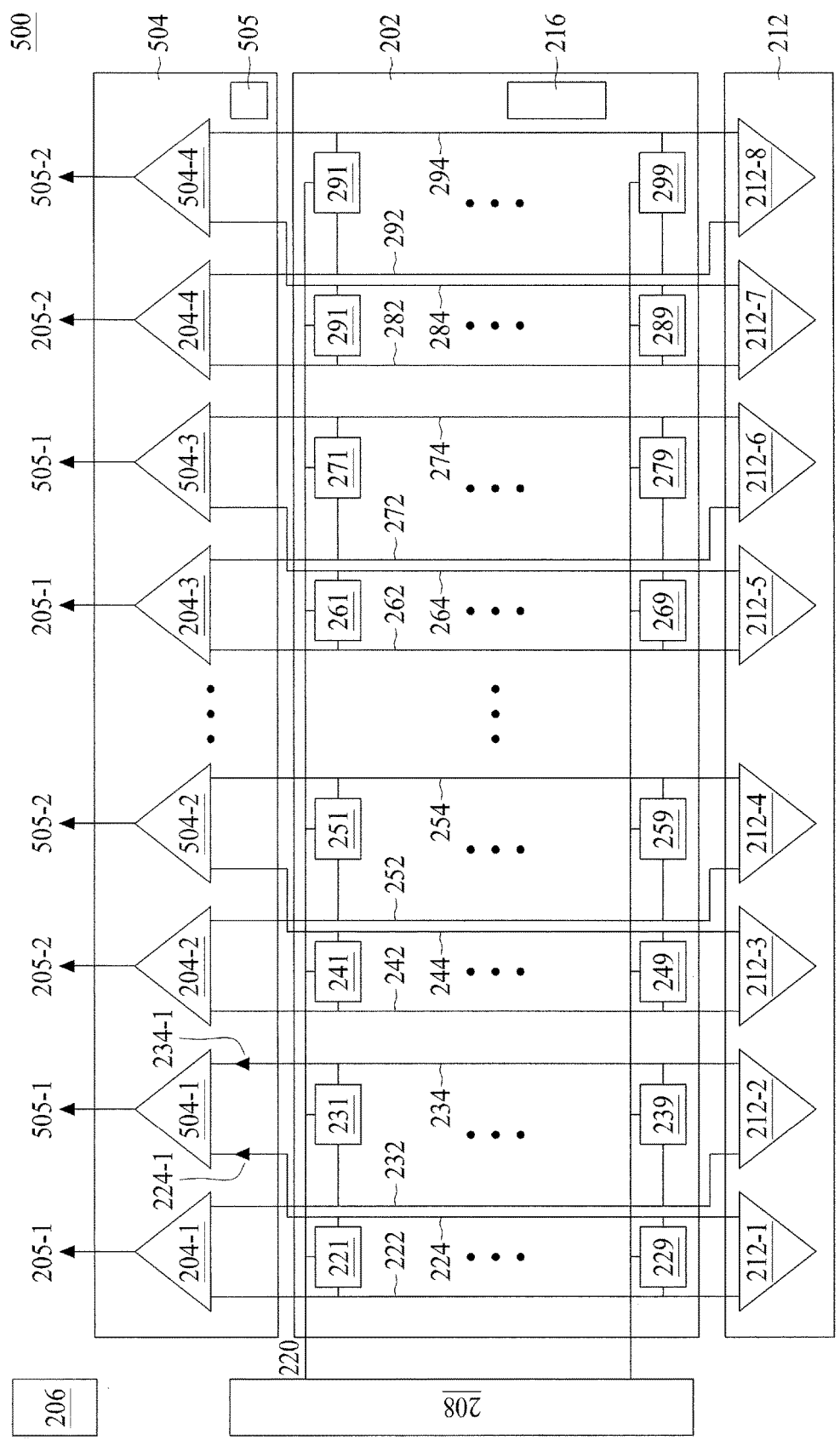
FIG. 5 illustrates an exemplary block diagram of the memory device in FIG. 1 including a schematic diagram of another authentication circuit, in accordance with some embodiments.

Referring now to FIG. 5, an embodiment of another memory device 500 is illustrated. The memory device 500 is substantially similar to the memory device 200 of FIG. 2 except that the memory device 500 includes a different authentication circuit 504 that is capable of providing more bits for a PUF signature than the memory device 200, which will be discussed in further detail as follows. Further, the authentication circuit 504 may include a compiler 505 that is substantially similar to the compiler 205 of the authentication circuit 204. That is, the compiler 505 may further process output bits provided by sense amplifiers of the authentication circuit 504.

In the illustrated embodiment of FIG. 5, the authentication circuit 504 includes a plurality of additional sense amplifiers (504-1, 504-2, 504-3 . . . 504-4) that are each coupled to a pair of BBL's at two adjacent columns. More particularly, in some embodiments, each of the additional sense amplifiers (504-1, 504-2, 504-3 . . . 504-4) may be coupled to two BBL's at two adjacent columns whose BL's are coupled to one of the sense amplifiers (204-1, 204-2, 204-3 . . . 204-4). For example, as illustrated in FIG. 5, the sense amplifier 504-1 is coupled to the BBL's 224 and 234 at the columns A and B whose BL's 222 and 232 are coupled to the sense amplifier 204-1; the sense amplifier 504-2 is coupled to the BBL's 244 and 254 at the columns C and D whose BL's 242 and 252 are coupled to the sense amplifier 204-2; the sense amplifier 504-3 is coupled to the BBL's 264 and 274 at the columns E and F whose BL's 262 and 272 are coupled to the sense amplifier 204-3; and the sense amplifier 504-4 is coupled to the BBL's 284 and 294 at the columns G and H whose BL's 282 and 292 are coupled to the sense amplifier 204-4. Similar to the operations of the sense amplifiers (204-1, 204-2, 204-3, and 204-4) as described above, the sense amplifiers (504-1, 504-2, 504-3, and 504-4) are each configured to compare either discharging rates of two discharging paths (through coupled BBL's) or charging rates of two coupled charging paths (through coupled BBL's), and, based on the comparison, to generate an output bit for a PUF signature. Details of the charging and discharging paths will be discussed further below with respect to FIG. 6.

Figure 6:
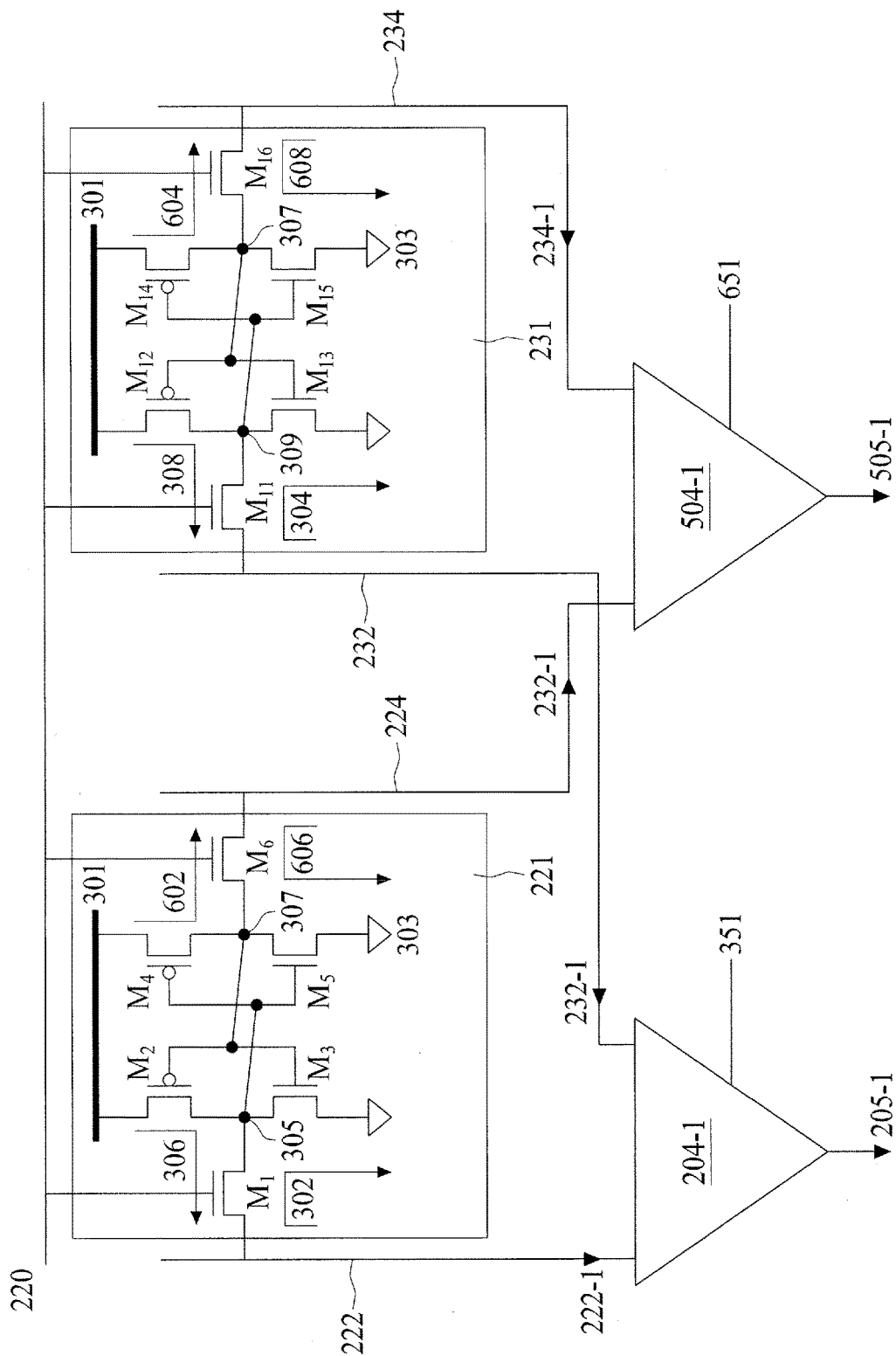
FIG. 6 illustrates an exemplary circuitry diagram of two adjacent memory cells of the SRAM cell array and two sense amplifiers of the authentication circuit of FIG. 5, in accordance with some embodiments.

FIG. 6 illustrates an exemplary circuit showing details of two adjacent cells 221 and 231, and their coupled sense amplifiers 204-1 and 504-1 of the authentication circuit 504 of FIG. 5, in accordance with various embodiments. As described in FIG. 3, when the data bits stored in the cells 221 and 231 are logical 0's (FIG. 4A), the BL's 222 and 232 are pre-charged to Vdd for reading the data bit and accordingly discharging paths 302 and 304 are formed, respectively (also shown in FIG. 6); and when the data bits stored in the cells 221 and 231 are logical 1's (FIG. 4B), the BL's 222 and 232 are pre-discharged to ground for reading the data bit and accordingly charging paths 306 and 308 are formed, respectively (also shown in FIG. 6). In some embodiments, when the data bits stored in the cells 221 and 231 are logical 0's, in addition to pre-charging the BL's 222 and 232 to Vdd, the control logic 214 may also cause the PC/PD circuit 206 to pre-discharge the BBL's 224 and 234 to ground. It is mentioned above that the complementary data bits are stored at the nodes 307 and 311, respectively. That is, in this example, the logical states of the complementary data bits are 1's. As such, charging path 602 may be formed from the supply voltage 301, through transistors M4 and M6, and to the BBL 224, and charging path 604 may be formed from the supply voltage 301, through transistors M14 and M16, and to the BBL 234. Similar to the operations of sense amplifier 204-1, after the charging paths 602 and 604 are formed, the sense amplifier 504-1 may not start comparing the charging rates of the charging paths 602 and 604 until an enablement signal 651 is received. Upon enablement signal 651 being received by the sense amplifier 504-1 (i.e., after $T_{enab}$), the sense amplifier 504-1 may start to compare the charging rates of the charging paths 602 and 604. Further, based on the comparison, an output bit 505-1 for a PUF signature may be generated while, simultaneously, the output bit 205-1 is generated by the sense amplifier 204-1 based on the comparison of the discharging rates of the discharging paths 302 and 304. In some embodiments, $T_{enab}$ of the enablement signal 651 may be substantially similar to or different from the $T_{enab}$ of the enablement signal 351.

Similarly, when the data bits stored in the cells 221 and 231 are logical 1's, in addition to pre-discharging the BL's 222 and 232 to ground, the control logic 214 may also cause the PC/PD circuit 206 to pre-charge the BBL's 224 and 234 to Vdd. As such, discharging path 606 may be formed from the BBL 224, through transistors M6 and M5, and to ground, and discharging path 608 may be formed from the BBL 234, through transistors M16 and M15, and to ground. Then the sense amplifier 504-1 starts to compare the discharging rates of the discharging paths 606 and 608 upon receiving the enablement signal 651. Accordingly, an output bit 505-1 for a PUF signature may be generated based on the comparison of the discharging rates of the discharging paths 606 and 608 while, simultaneously, the output bit 205-1 is generated by the sense amplifier 204-1 based on the comparison of the charging rates of the charging paths 306 and 308.

Referring back to FIGS. 2 and 5, every time while the memory cell array 202 being accessed (read), each of the sense amplifiers of the authentication circuit 204 (FIG. 2) is coupled to two BL's or BBL's of two adjacent cells of the memory cell array 202 so that the sense amplifier of the authentication circuit 204 is configured to compare either discharging rates or charging rates of those two adjacent cells. As such, for an $N^2$-bit cell array, a PUF signature generated by the authentication circuit 204 may include $\frac{1}{2}N^2$ bits. In FIG. 5, in addition to $\frac{1}{2}N^2$ bits generated by the authentication circuit 504's sense amplifiers (204-1, 204-2, 204-3 . . . 204-4), the authentication circuit 504 may generate other $\frac{1}{2}N^2$ bits using the sense amplifiers (504-1, 504-2, 504-3 . . . 504-4). More specifically, the authentication circuit 504 compare both the discharging rates and charging rates of two adjacent cells. As such, the authentication circuit 504 may generate a PUF signature, for an $N^2$-bit cell array, that includes $N^2$ bits.

Figure 7:
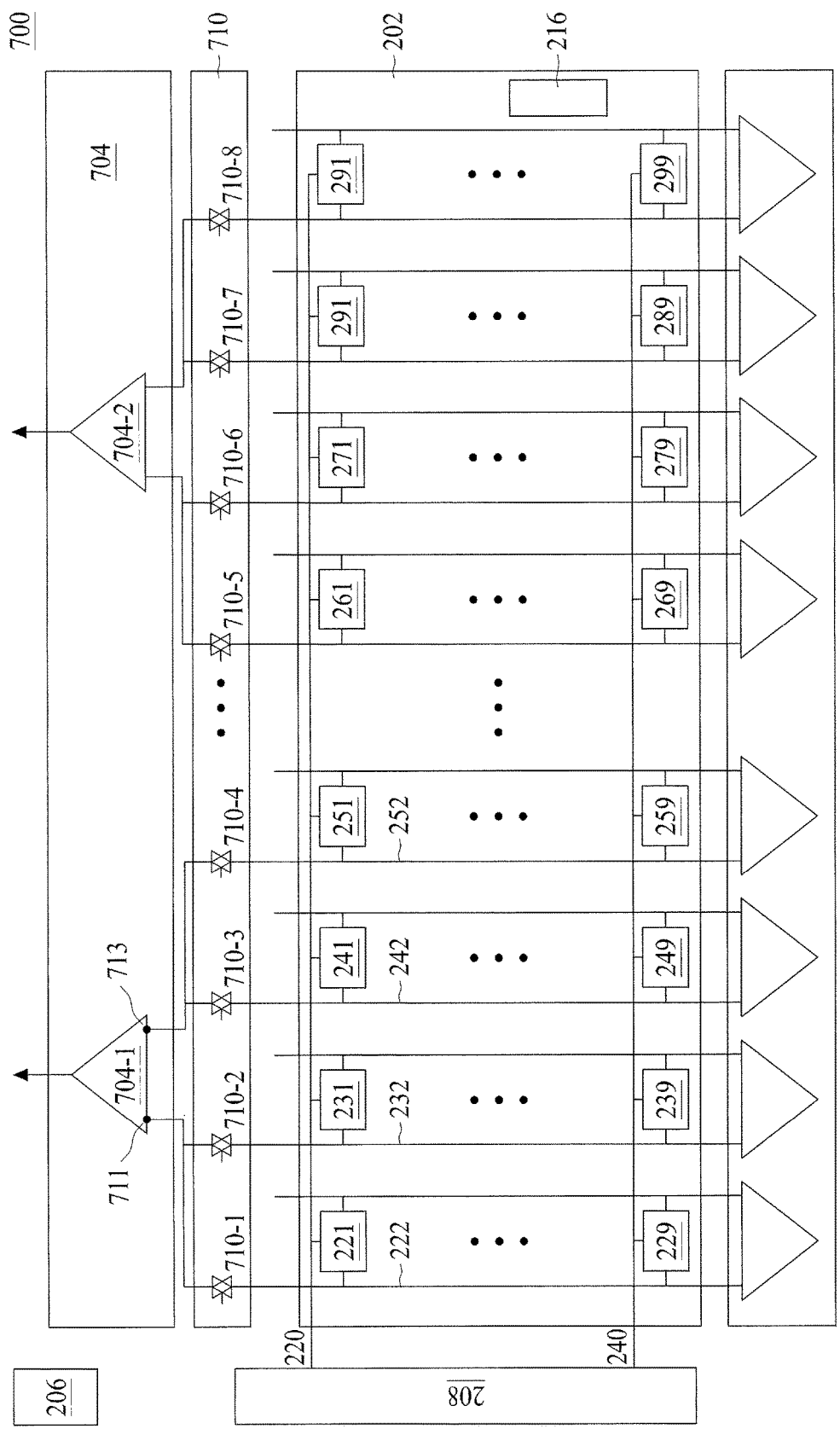
FIG. 7 illustrates an exemplary block diagram of the memory device in FIG. 1 including a schematic diagram of yet another authentication circuit, in accordance with some embodiments.

Referring to FIG. 7, a memory device 700 comprising a column decoder 710 is disclosed in accordance with various embodiments. The memory device 700 is substantially similar to the memory devices 200 (FIG. 2) and 500 (FIG. 5) except that the memory device 700's authentication circuit 704 comprises fewer sense amplifiers than the authentication circuits 204 and 504. Further, the memory device 700 includes column decoder 710 coupled between the memory cell array 202 and the authentication circuit 704. In some embodiments, the column decoder 710 is substantially similar to the column decoder 110 that are both configured to receive one or more column addresses so as to assert corresponding BL('s) or BBL('s).

Referring still to FIG. 7, the column decoder 710 includes switches 710-1, 710-2, 710-3, 710-4, 710-5, 710-6, 710-7, and up to 710-8, as illustrated. Although only 8 switches are shown in FIG. 7, any desired number of switches may be disposed between the switches 710-4 and 710-5 while remaining within the scope of the present disclosure. In the illustrated embodiment of FIG. 7, the authentication circuit 704 includes sense amplifiers 704-1 and 704-2. In some specific embodiments, each sense amplifier of the authentication circuit 704 is coupled to at least four switches of the column decoder 710 wherein each of the at least four switches is coupled to either a BL (or BBL) of the memory cell array 202. In the illustrated embodiment of FIG. 7, the switch 710-1 is coupled to the BL 222; the switch 710-2 is coupled to the BL 232; the switch 710-3 is coupled to the BL 242; the switch 710-4 is coupled to the BL 252; and these four switches (710-1, 710-2, 710-3, 710-4) are coupled to the sense amplifier 704-1. Similarly, the switch 710-5 is coupled to the BL 262; the switch 710-6 is coupled to the BL 272; the switch 710-7 is coupled to the BL 282; the switch 710-8 is coupled to the BL 292; and these four switches (710-5, 710-6, 710-7, 710-8) are coupled to the sense amplifier 704-2. Still in some embodiments, the four BL's coupled to the sense amplifier of the authentication circuit 704 are substantially adjacent to one another in which there is no additional BL disposed between any two of the four BL's, as illustrated in FIG. 7. Further, the sense amplifier of the authentication circuit 704 includes a first input and a second input. The first input is coupled to a first pair of the four BL's in which no additional BL is disposed therebetween, and the second input is coupled to the other pair of the four BL's in which no additional BL is disposed therebetween as well. For example, the sense amplifier 704-1 includes inputs 711 and 713 in which input 711 is coupled to the BL's 222 and 232 through switches 710-1 and 710-2, respectively, and input 713 is coupled to the BL's 242 and 252 through switches 710-3 and 710-4, respectively.

The operations of the sense amplifiers (704-1, 704-2) of the authentication circuit 704 are substantially similar to the sense amplifier of authentication circuits 204 and 504. In order to cause the authentication circuit 704 to generate a PUF signature for the memory cell array 202, the operations are substantially similar to the operations of the authentication circuit 204 (FIG. 2) except that the control logic 214 of the memory device 700 may cause the column decoder 710 to assert two out of four switches (one from each pair) coupled to a sense amplifier of the authentication circuit 704 before the sense amplifier starts to compare discharging/charging rates of the coupled cells. For example, the control logic 214 may assert the switches 710-1 and 710-3, which allows the sense amplifier 704-1 to compare discharging/charging rates of the cells at columns A and C. In other words, the column coupled to the asserted switch is also asserted. Accordingly, the sense amplifier of the authentication circuit 704 may compare discharging/charging rates of two cells that are each located at the asserted columns Based on the comparison, an output bit for a PUF signature may be generated by the sense amplifier of the authentication circuit 704.

Figure 8:
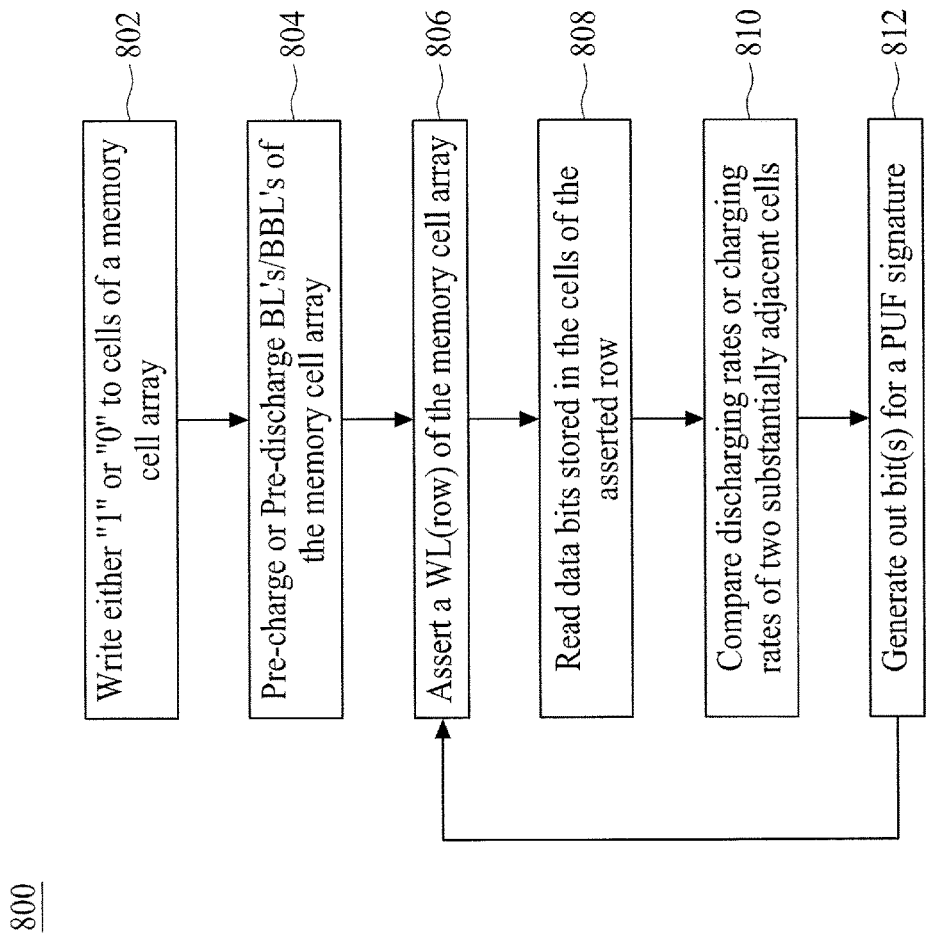
FIG. 8 illustrates an exemplary flow chart of a method of generating a physically unclonable function (PUF) signature for the SRAM cell array of FIG. 2, in accordance with various embodiments.

FIG. 8 illustrates an exemplary flow chart of a method 800 of generating a physically unclonable function (PUF) signature for the SRAM cell array of FIG. 2 in accordance with various embodiments. In various embodiments, the operations of method 800 are performed by the respective components illustrated in FIGS. 2-4B. For purposes of discussion, the following embodiment of the method 800 will be described in conjunction with FIGS. 2-4B. The illustrated embodiment of the method 800 is merely an example so that any of a variety of operations may be omitted, re-sequenced, and/or added while remaining within the scope of the present disclosure.

The method 800 starts at operation 802 in which a data bit (either a logical 1 or 0) is written to each of the cells (e.g., 221, 231, 241, 251, 261, 271, 281, 291, 229, 239, 249, 259, 269, 279, 289, and up to 299) of the memory cell array 202. In some embodiments, the control logic 214 may cause the I/O circuit 212 to write a logical 1 or 0 to all the cells of the memory cell array 202. Based on the logical state of the data bit (i.e., either a logical 1 or 0) written to the cells, the method 800 continues to operation 804 in which the PC/PD circuit 206 either pre-charges the BL's and BBL's of the memory cell array 202 to Vdd, or pre-discharges the BL's and BBL's of the memory cell array 202 to ground. In some embodiments, if the logical state written to all the cells is a logical 0, the control logic 214 may cause the PC/PD circuit 206 to pre-charge the BL's and BBL's to Vdd; if the logical state written to all the cells is a logical 1, the control logic 214 may cause the PC/PD circuit 206 to pre-discharge the BL's and BBL's to ground.

Referring still to FIG. 8, the method 800 continues to operation 806 in which the row decoder 208 asserts a WL of the memory cell array based on a received row address. In some embodiments, such a row address may be provided by the control logic 214. As described above, each row address corresponds to a row of the memory cell array, and each row has a corresponding WL. In an example, row "a" is asserted.

The method 800 then proceeds to operation 808 in which the I/O circuit 212 starts to read the data bits written (stored) in the cells at the asserted row. Continuing with the above example, the sense amplifiers 212-1 and 212-2 of the I/O circuit 212 may read the data bits stored at their coupled cell at the asserted row a, which are cells 221 and 231, respectively.

While the data bit is being read by the sense amplifier of the I/O circuit 212, the method 800 continues to 810 in which the sense amplifier (e.g., 204-1, 204-2, 204-3, 204-4) of the authentication circuit 204 starts to compare reading speeds (i.e., discharging rates or charging rates) of two cells in the asserted row/WL. In the same example, these two cells (e.g., 221 and 231) are coupled to the sense amplifier 204-1 of the authentication circuit 204 through their respective BL's (e.g., 222 and 232) or BBL's, as illustrated in FIG. 2. As described above, if the logical state of the data bits written to the cells is a logical 0, the BL's and BBL's are pre-charged to Vdd. Accordingly, the sense amplifier (e.g., 204-1) of the authentication circuit 204 may compare the discharging rates of those two substantially adjacent cells (e.g., 221 and 231). On the other hand, if the logical state of the data bits written to the cells is a logical 0, the BL's and BBL's are pre-discharged to ground. As such, the sense amplifier (e.g., 204-1) of the authentication circuit 204 may compare the charging rates of those two substantially adjacent cells (e.g., 221 and 231).

Referring still to FIG. 8, the method 800 continues to operation 812 in which the sense amplifier of the authentication circuit 204 generates an output bit for a PUF signature based on the comparison of the discharging or charging rates. In some embodiments, each of the sense amplifiers (e.g., 204-1, 204-2, 204-3, 204-4) of the authentication circuit 204 may simultaneously generate an output bit for the PUF signature based on the respective comparison of the discharging or charging rates on its coupled cells. As such, for a row/WL being asserted, a first plurality of output bits for the PUF signature may be generated. In some embodiments, the method 800 may again proceed to operation 806 in which one or more other WL's are asserted. Following the similar operations described above (from operations 806 to 812), one or more pluralities of output bits for the PUF signature may be generated by the sense amplifiers of the authentication circuit 204 through comparing the discharging and/or charging rates of their coupled cells.

Figure 9:
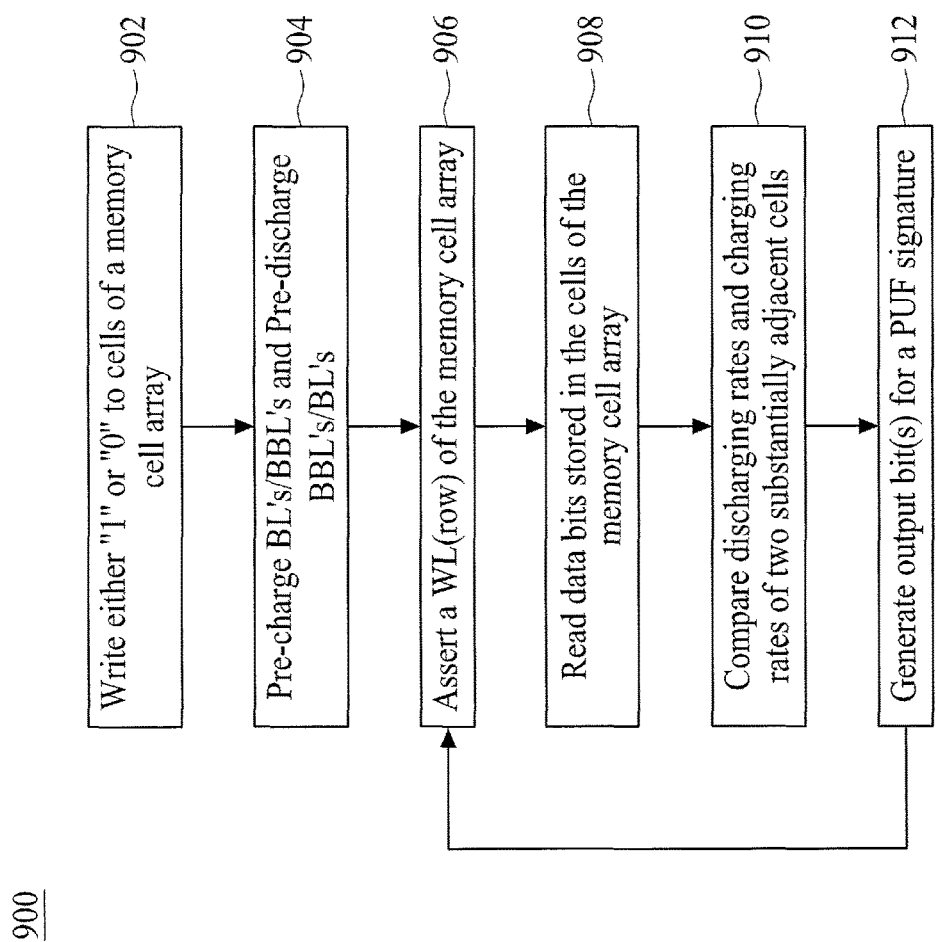
FIG. 9 illustrates an exemplary flow chart of a method of generating a physically unclonable function (PUF) signature for the SRAM cell array of FIG. 5, in accordance with various embodiments.

FIG. 9 illustrates another exemplary flow chart of a method of generating a physically unclonable function (PUF) signature for the SRAM cell array of FIG. 5 in accordance with various embodiments. In various embodiments, the operations of method 900 are performed by respective components described in FIGS. 5-6. For purposes of discussion, the following embodiment of the method 900 will be described in conjunction with FIGS. 5-6. The illustrated embodiment of the method 900 is merely an example so that any of a variety of operations may be omitted, re-sequenced, and/or added while remaining within the scope of the present disclosure.

The method 900 starts at operation 902 in which a data bit that is either a logical 1 or 0 is written to each of the cells (e.g., 221, 231, 241, 251, 261, 271, 281, 291, 229, 239, 249, 259, 269, 279, 289, and up to 299) of the memory cell array 202. In some embodiments, the control logic 214 may cause the I/O circuit 212 to write a logical 1 or 0 to all the cells of the memory cell array 202. As described above, for example, when a data bit (e.g., a logical 0) is written to a cell (e.g., 221), one node (e.g., 305) is configured to store the data bit and another node (e.g., 307) is configured to store the complementary data bit.

Based on the logical state of the data bit (i.e., either a logical 1 or 0) written to the cells, the method 900 continues to operation 904 in which the PC/PD circuit 206 pre-charges the BL's or BBL's of the memory cell array 202 to Vdd, and pre-discharges the BBL's or BL's of the memory cell array 202 to ground. That is, if the BL's are pre-discharged, the BBL's are pre-charged, and vice versa. In an example, as described above in connection with FIG. 6, if the logical state written to all the cells, including cells 221 and 231, is a logical 0, the nodes 305 and 309 of the cells 221 and 231, respectively, are at the logical state 0; and the nodes 307 and 311 of the cells 221 and 231, respectively, are at the complementary logical state 1. As such, the control logic 214 may cause the PC/PD circuit 206 to pre-charge the BL's 222 and 232 to Vdd, and pre-discharge the BBL's 224 and 234 to ground. On the other hand, if the logical state written to all the cells is a logical 1, the control logic 214 may cause the PC/PD circuit 206 to pre-discharge the BL's 222 and 232 to ground, and pre-charge the BBL's 224 and 234 to Vdd.

Referring still to FIG. 9, the method 900 continues to operation 906 in which the row decoder 208 asserts a WL of the memory cell array based on a received row address. In some embodiments, such a row address may be provided by the control logic 214. As described above, each row address corresponds to a row of the memory cell array, and each row has a corresponding WL. In an example, row "a" is asserted. The method 900 then proceeds to operation 908 in which the I/O circuit 212 starts to read the data bits written (stored) in the cells at the asserted row. Continuing with the above example, the sense amplifiers 212-1 and 212-2 of the I/O circuit 212 may read the data bits stored at their coupled cell at the asserted row a, which are cells 221 and 231, respectively.

While the data bit being read by the sense amplifier of the I/O circuit 212, the method 900 continues to 910 in which at least two of the sense amplifiers (e.g., 204-1, 204-2, 204-4, 204-4, 504-1, 504-2, 504-3, 504-4) of the authentication circuit 504 starts to compare reading speeds (i.e., discharging rates and charging rates) of two substantially adjacent cells at that asserted row/WL. More specifically, one of the sense amplifiers coupled to the substantially adjacent cells' respective BL's starts to compare the discharging rates or charging rates of the substantially adjacent cells, and one of the sense amplifiers coupled to the substantially adjacent cells' respective BBL's starts to compare the charging rates or discharging rates (complementary to the former) of the substantially adjacent cells. In the same example, these two substantially adjacent cells 221 and 231 are coupled to the sense amplifier 204-1 of the authentication circuit 204 through their respective BL's 222 and 232, and coupled to the sense amplifier 504-1 of the authentication circuit 504 through their respective BBL's 224 and 234, as illustrated in FIG. 5. As described above and continuing using the example as now referring to FIG. 6, if the logical state of the data bits written to the cells is a logical 0, the BL's 222 and 232 are pre-charged to Vdd, and the BBL's 224 and 234 are pre-discharged to ground. Accordingly, the sense amplifier 204-1 of the authentication circuit 504 may compare the discharging rates of the cells 221 and 231 through the BL's 222 and 232, and the sense amplifier 504-1 of the authentication circuit 504 may compare the charging rates of the cells 221 and 231 through the BBL's 224 and 234. On the other hand, if the logical state of the data bits written to the cells is a logical 1, the BL's 222 and 232 are pre-discharged to ground, and the BBL's 224 and 234 are pre-charged to Vdd. Accordingly, the sense amplifier 204-1 of the authentication circuit 504 may compare the charging rates of the cells 221 and 231 through the BL's 222 and 232, and the sense amplifier 504-1 of the authentication circuit 504 may compare the discharging rates of the cells 221 and 231 through the BBL's 224 and 234.

Referring still to FIG. 9, the method 900 continues to operation 912 in which the sense amplifier of the authentication circuit 504 generates an output bit for a PUF signature based on the comparison of the discharging or charging rates. Since in the embodiment of FIGS. 5 and 6, every two substantially adjacent cells are coupled to two sense amplifiers of the authentication circuit 504, as described above, the sense amplifiers of the authentication circuit 504 may be able to generate two output bits for a PUF signature while/after comparing the discharging rates and charging rates of these two substantially adjacent cells. In some embodiments, each of the sense amplifiers of the authentication circuit 504 may simultaneously generate an output bit for the PUF signature based on the respective comparison of the discharging or charging rates on its coupled cells. As such, for a row/WL being asserted, a first plurality of output bits for the PUF signature may be generated. In some embodiments, the method 900 may route to operation 906 in which one or more other WL's are asserted. Following the similar operations described above (from operations 906 to 912), one or more pluralities of output bits for the PUF signature may be generated by the sense amplifiers of the authentication circuit 504 through comparing the discharging and charging rates of their coupled cells.

Figure 10:
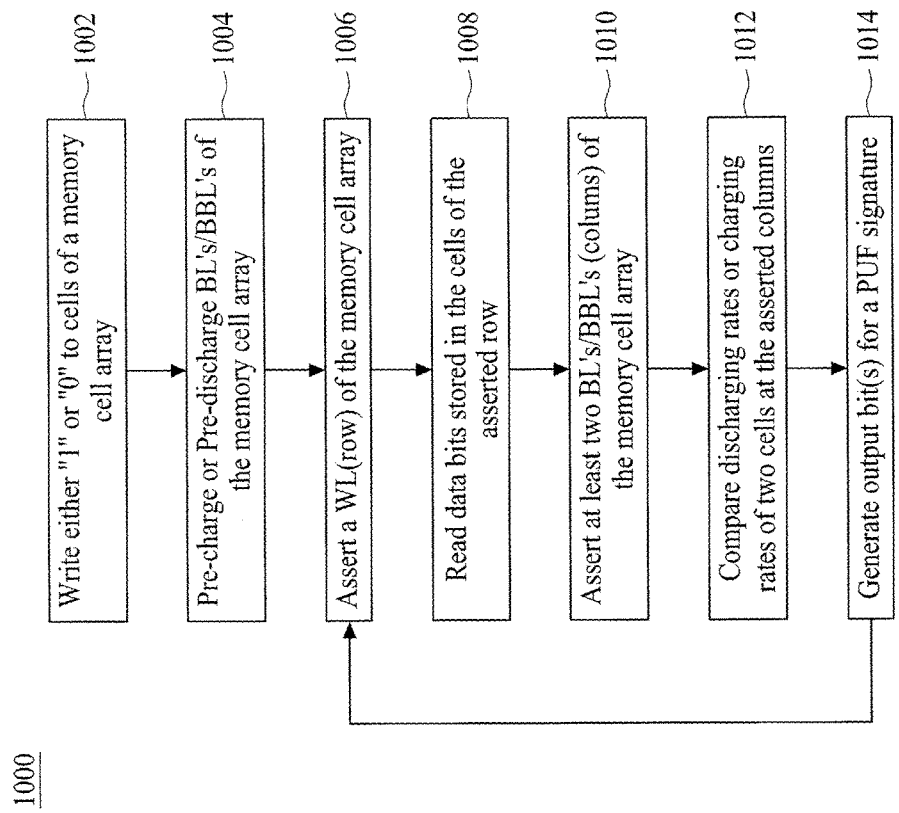
FIG. 10 illustrates an exemplary flow chart of a method of generating a physically unclonable function (PUF) signature for the SRAM cell array of FIG. 7, in accordance with various embodiments.

FIG. 10 yet another exemplary flow chart of a method of generating a physically unclonable function (PUF) signature for the SRAM cell array of FIG. 7 in accordance with various embodiments. In various embodiments, the operations of method 1000 are performed by corresponding components described in FIG. 7. For purposes of discussion, the following embodiment of the method 1000 will be described in conjunction with FIG. 7. The illustrated embodiment of the method 1000 is merely an example so that any of a variety of operations may be omitted, re-sequenced, and/or added while remaining within the scope of the present disclosure.

In some embodiments, the method 1000 is substantially similar to the method 800 except that before a sense amplifier of the authentication circuit 704 compares the discharging/charging rates, the column decoder 710 may assert two out of four BL's or BBL's (through selectively turning on coupled switches) for the sense amplifier of the authentication circuit 704, which corresponds to operation 1010 of FIG. 10. That is, operations 1002, 1004, 1006, and 1008 of FIG. 10 are substantially similar to the operations 802, 804, 806, and 808, respectively. Thus, for brevity, the following discussion of the method 1000 will be focused from the operation 1010 to operation 1014.

While the data bit being read by the sense amplifier of the I/O circuit 212 (operation 1008 of FIG. 10), at step 1010, the column decoder 710 asserts two out of four BL's or BBL's for a sense amplifier of the authentication circuit 704. As illustrated in the embodiment of FIG. 7, each BL is coupled to a sense amplifier of the authentication circuit 704 through a switch of the column decoder 710, and each of the sense amplifier's two inputs is coupled to two substantially adjacent BL's through their respectively coupled switch. That is, each sense amplifier of the authentication circuit 704 is coupled to four BL's (or BBL's) through a corresponding switch. In some embodiments, the column decoder 710 may assert two BL's, for a sense amplifier of the authentication circuit 704, that are spaced from one another with exactly one BL disposed therebetween through selectively turning on the corresponding switches. Accordingly, the asserted BL's are coupled to the sense amplifier of the authentication circuit 704. For example, in FIG. 7, the column decoder 710 may turn on the switches 710-1 and 710-3 for the sense amplifier 704-1 so that the BL's are 222 and 242 are (asserted) coupled to the sense amplifier 704-1, and turn on the switches 710-5 and 710-7 for the sense amplifier 704-2 so that the BL's are 262 and 282 are (asserted) coupled to the sense amplifier 704-2.

Referring still to FIG. 10, the method continues to operation 1012 in which the sense amplifier of the authentication circuit 704 starts to compare reading speeds (i.e., either discharging rates or charging rates) of two cells that are disposed at that asserted row/WL and at the asserted columns Continuing using the above example, these two cells 221 and 241 are coupled to the sense amplifier 704-1 of the authentication circuit 704 through their respective BL's 222 and 242 or BBL's, as illustrated in FIG. 7. As described above, if the logical state of the data bits written to the cells is a logical 0, the BL's and BBL's are pre-charged to Vdd. Accordingly, the sense amplifier 704-1 may compare the discharging rates of those two cells 221 and 241. On the other hand, if the logical state of the data bits written to the cells is a logical 0, the BL's and BBL's are pre-discharged to ground. As such, the sense amplifier 704-1 may compare the charging rates of those two cells 221 and 241.

Referring still to FIG. 10, the method 1000 continues to operation 1014 in which the sense amplifier of the authentication circuit 704 generates an output bit for a PUF signature based on the comparison of the discharging or charging rates. In some embodiments, each of the sense amplifiers (e.g., 704-1, 704-2) of the authentication circuit 704 may simultaneously generate an output bit for the PUF signature based on the respective comparison of the discharging or charging rates on its coupled cells. As such, for a row/WL being asserted, a first plurality of output bits for the PUF signature may be generated. In some embodiments, the method 1000 may route to operation 1006 in which one or more other WL's are asserted. Following the similar operations described above (from operations 806/1006 to 1014), one or more pluralities of output bits for the PUF signature may be generated by the sense amplifiers of the authentication circuit 704 through comparing the discharging or charging rates of their coupled cells.

Figure 11A:
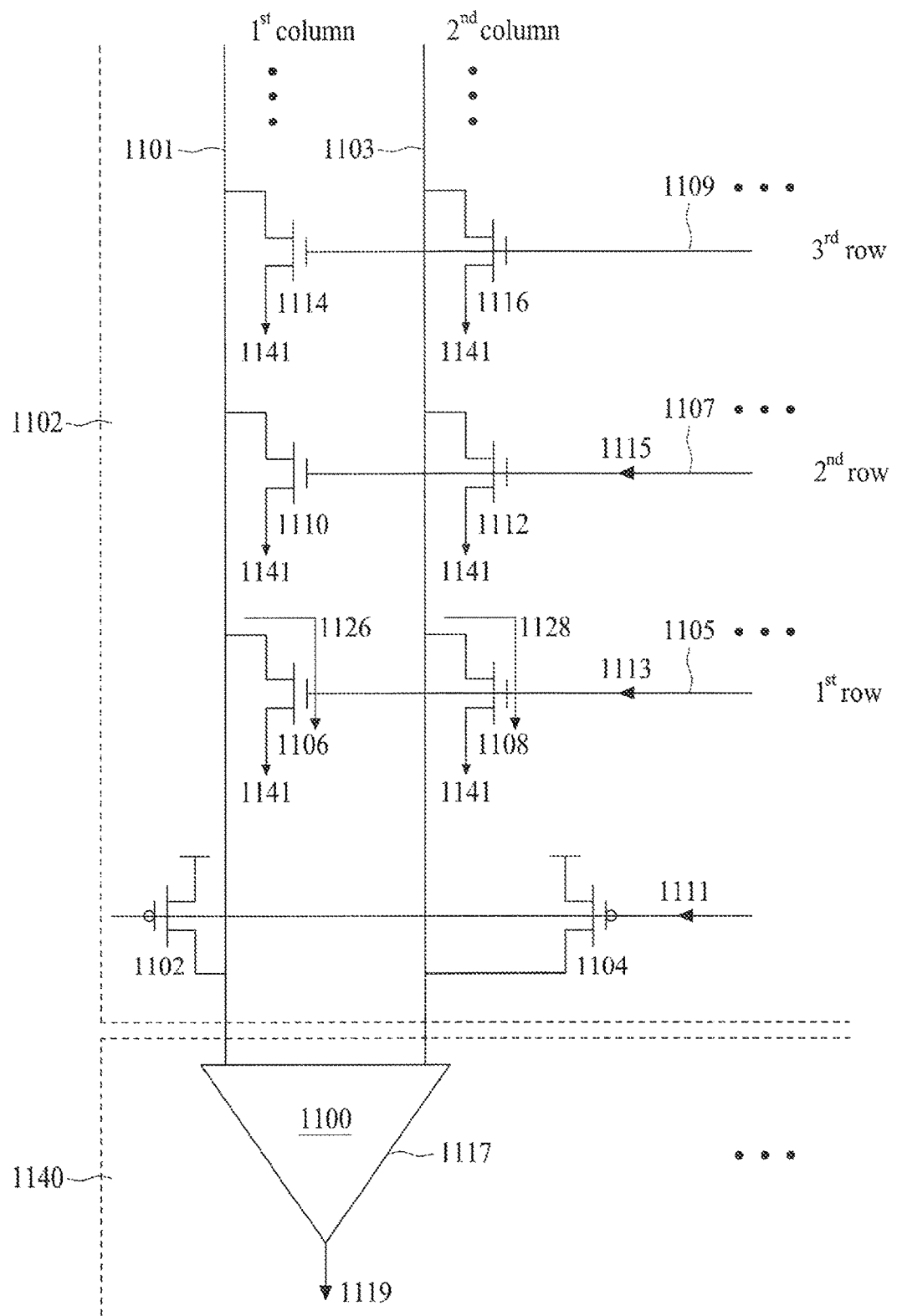
FIG. 11A illustrates an exemplary circuitry diagram of two adjacent bit lines of a logic NMOS array and a sense amplifier of a authentication circuit coupled to the logic NMOS array, in accordance with some embodiments.
Figure 12A:
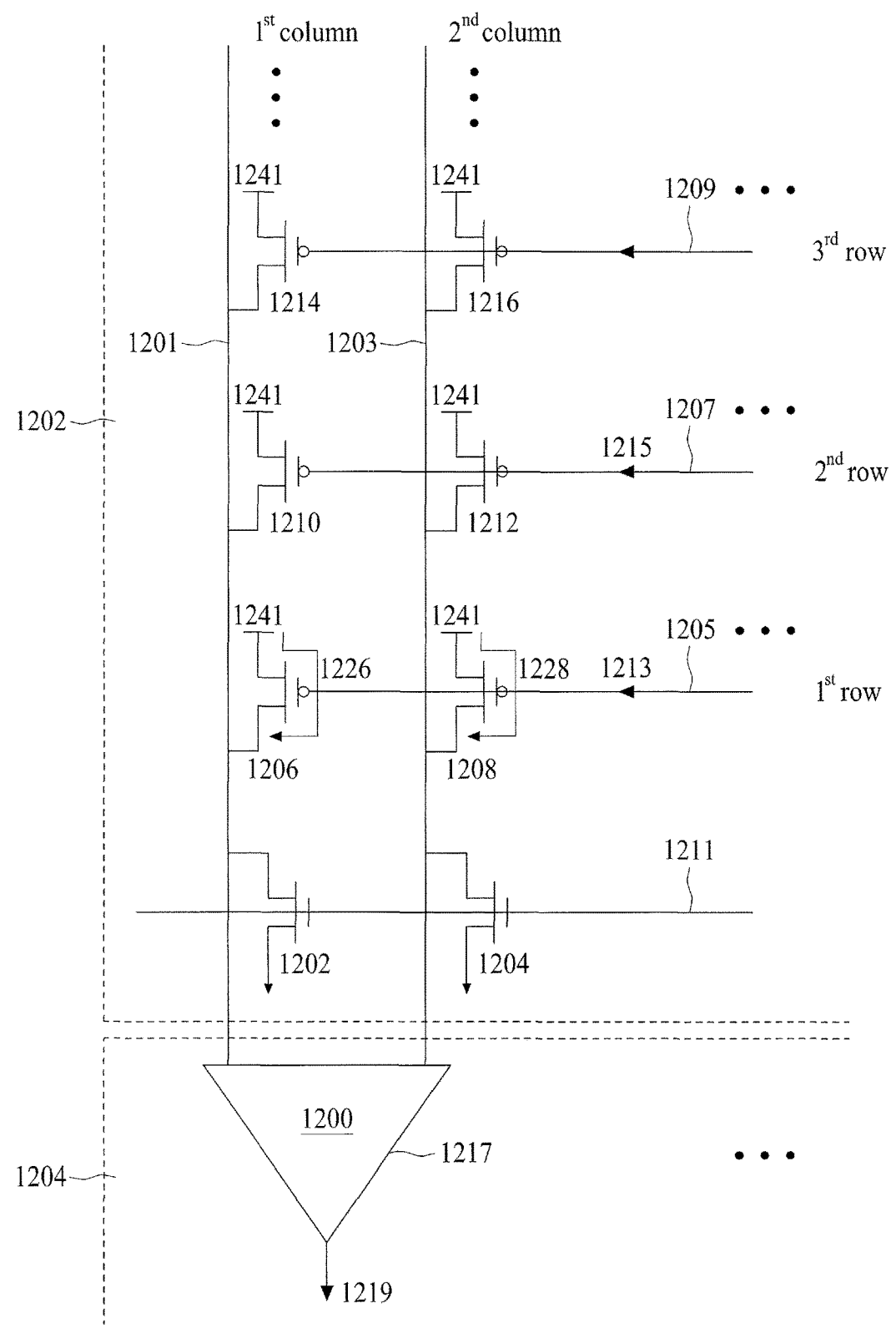
FIG. 12A illustrates an exemplary circuitry diagram of two adjacent bit lines of a logic PMOS array and a sense amplifier of a authentication circuit coupled to the logic PMOS array, in accordance with some embodiments.
Figure 13A:
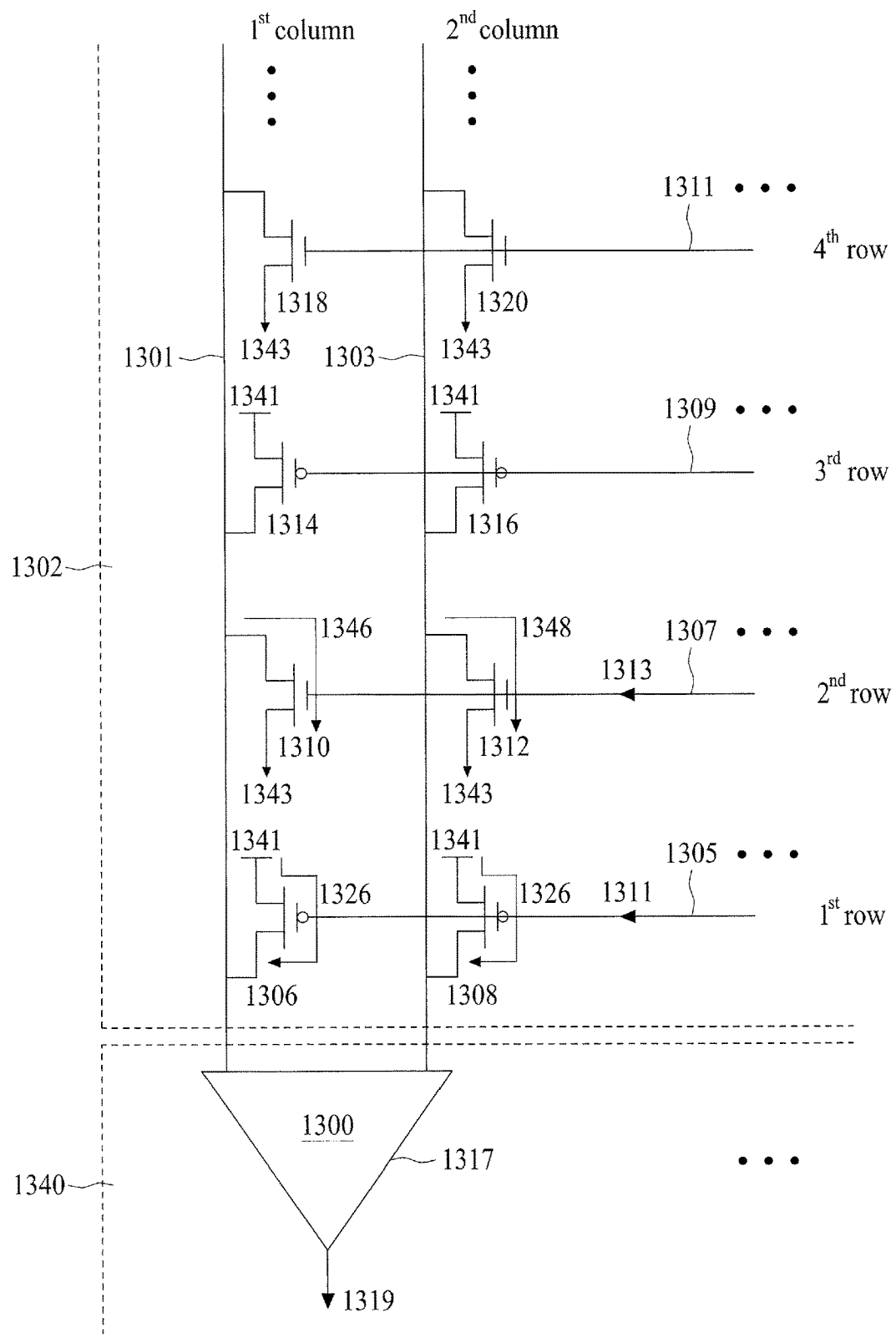
FIG. 13A illustrates an exemplary circuitry diagram of two adjacent bit lines of a hybrid logic PMOS and NMOS array and a sense amplifier of a authentication circuit coupled to the hybrid logic PMOS and NMOS array, in accordance with some embodiments.

As mentioned above, the memory cell array 102/202 may be implemented as any of a variety of memory arrays other than the SRAM array. FIG. 11A is an exemplary circuit diagram illustrating part of the memory array 102 and part of the authentication circuit 104, wherein the memory array 102 is implemented as a logic NMOS array 1102. FIG. 12A is another exemplary circuit diagram illustrating part of the memory array 102 and part of the authentication circuit 104, wherein the memory array 102 is implemented as a logic PMOS array 1202. FIG. 13A is an exemplary circuit diagram illustrating part of the memory array 102 and part of the authentication circuit 104, wherein the memory array 102 is implemented as a hybrid logic NMOS and PMOS array. Details of these three exemplary implementations will be discussed in further detail below, respectively.

Referring first to FIG. 11A, similar to the SRAM array 202, the logic NMOS array 1102 of FIG. 11A includes plural logic NMOS transistors 1106, 1108, 1110, 1112, 1114, and 1116, as cell bits, which are arranged in a column-row configuration except that the logic NMOS array 1102 further includes plural pre-charge transistors 1102 and 1104 each coupled to a BL. For brevity, only two columns, herein "1$^{st}$ column" and "2$^{nd}$ column," and three rows, herein "1$^{st}$ row," "2$^{nd}$ row," and "row," are shown in FIG. 11A. It is noted that any desired number of columns and rows can be included in the logic NMOS array 1102 while remaining within the scope of the present disclosure.

Accordingly, each column includes a BL that is coupled to the logic NMOS transistors disposed therein, and each row includes a WL that is coupled to the logic NMOS transistors disposed therein. As shown, 1$^{st}$ column includes logic NMOS transistors 1106, 1110, 1114, etc., that are disposed along the 1$^{st}$ column and coupled to BL 1101; 2$^{nd}$ column includes logic NMOS transistors 1108, 1112, 1116, etc., that are disposed along the 2$^{nd}$ column and coupled to BL 1103; 1$^{st}$ row includes logic NMOS transistors 1106, 1108, etc., that are disposed along the 1$^{st}$ row and coupled to WL 1105; 2$^{nd}$ row includes logic NMOS transistors 1110, 1112, etc., that are disposed along the 2$^{nd}$ row and coupled to WL 1107; 3$^{rd}$ row includes logic NMOS transistors 1114, 1116, etc., that are disposed along the 3$^{rd}$ row and coupled to WL 1109. In some embodiments, each of the logic NMOS transistors is coupled to the respective BL at its drain end and to a voltage level 1141 (e.g., ground) at its source end. Further, each WL is configured to provide an assertion signal (e.g., 1113, 1115, etc.) to gates of coupled logic NMOS transistors so as to turn on one or more respective logic NMOS transistors. For example, the assertion signal 1113, provided by the WL 1105, may be used to turn on the logic NMOS transistors 1106 and 1108; the assertion signal 1115, provided by the WL 1107, may be used to turn on the logic NMOS transistors 1110 and 1112.

Regarding the pre-charge transistors 1102 and 1104, in the illustrated embodiment of FIG. 11, each of the pre-charge transistors may be implemented as a PMOS transistor. Such a pre-charge transistor is coupled to a BL, and configured to receive a pre-charge control signal (e.g., 1111) so as to cause itself to be turned on. The authentication circuit 104 (referred to as "1140" in FIG. 11A) coupled to the logic NMOS array 1102 is substantially similar to the above-described embodiments as including plural sense amplifiers, wherein each sense amplifier (e.g., 1110) is coupled to two adjacent BL's (e.g., 1101 and 1103). In some embodiments, each of the sense amplifiers of the authentication circuit 1204 (e.g., 1110) may include a voltage-mode sense amplifier (e.g., 204-1, 204-2, 204-3, and 204-4 of FIG. 2, and 504-1, 504-2, 504-3, and 504-4 of FIG. 5). In some other embodiments, the sense amplifier may include a current-mode sense amplifier. Operations of the logic NMOS array 1102 and corresponding authentication circuit 1140, discussed below, will be directed to implementing the sense amplifier 1100 as a voltage-mode sense amplifier.

In some embodiments, the operations of the logic NMOS array 1102 and the sense amplifier 1100 are substantially similar to the above-discussed operation with respect to FIG. 4A. Similarly, for the sense amplifier 1100 to generate an output bit 1119 based on the difference of discharging rates, in some embodiments, the BL's 1101 and 1103 are first pre-charged to Vdd. Then plural rows are sequentially selected so that each sense amplifier of the authentication circuit 1140 is allowed to compare the discharging rates present on respective BL's.

Figure 11B:
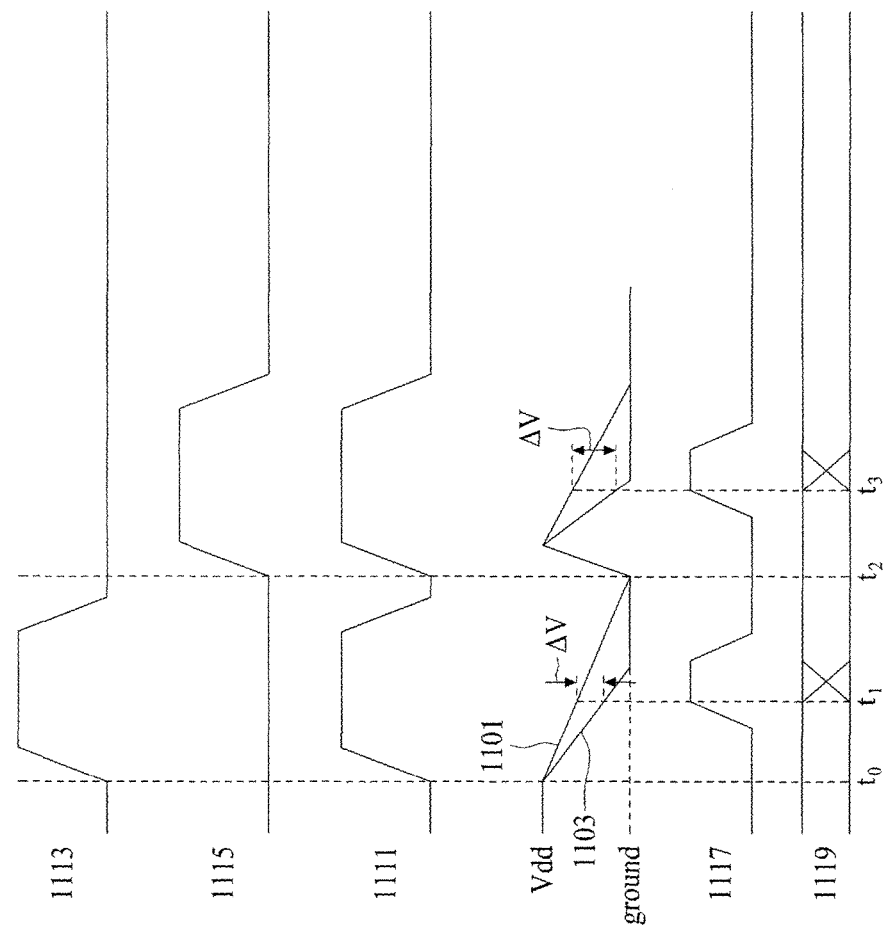
FIG. 11B is an exemplary diagram illustrating waveforms of signals of the logic NMOS array and the sense amplifier of FIG. 11A, in accordance with some embodiments.

For example, the 1$^{st}$ row is selected at time "t1" by asserting the assertion signal 1113 to high. As such, the logic NMOS transistors (e.g., 1106, 1108, etc.) are turned on. In some embodiments, concurrently, at time t1, the pre-charge control signal 1111 is asserted to high, which accordingly turns off the pre-charge transistors 1102 and 1104. Consequently, discharging paths 1126 and 1128 are formed from the BL 1101, through the logic NMOS transistor 1106, to ground, and from the BL 1103, through the logic NMOS transistor 1108, to ground, respectively, and as such, voltage levels present on the BL's 1101 and 1103 start to drop with respective discharging rates, as shown in FIG. 11B. Once the difference between the voltages levels on the BL's 1101 and 1103 exceeds a pre-defined threshold (ΔV), at time "t2," enablement signal 1117 is triggered to high. Accordingly, a first output bit 1119 is generated by the sense amplifier 1100 for generating a PUF signature. Subsequently, the 2$^{nd}$ row is selected at time "t3" by asserting the assertion signal 1115 to high, and following the above-described operation, at time "t4," a second output bit 1119 is generated by the sense amplifier 1100 for generating another PUF signature.

Figure 12B:
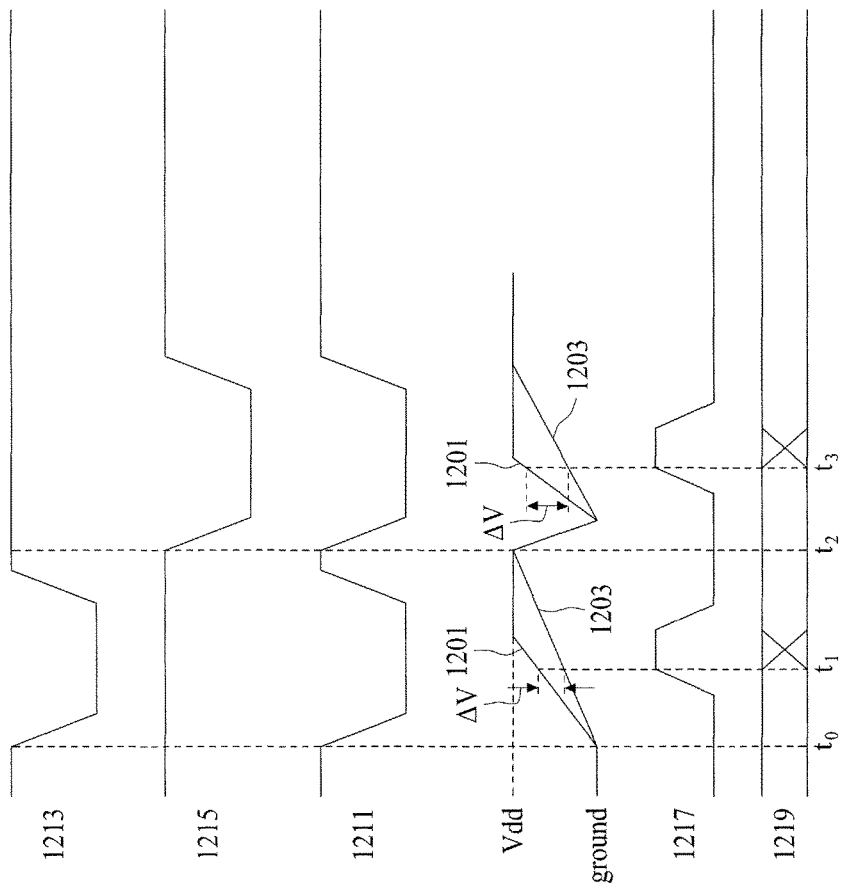
FIG. 12B is an exemplary diagram illustrating waveforms of signals of the logic PMOS array and the sense amplifier of FIG. 12A, in accordance with some embodiments.

The logic PMOS array 1202 of FIG. 12A is substantially similar to the logic NMOS array 1102 of FIG. 11A except that each of the cell bits of the logic PMOS array 1202 includes a logic PMOS transistor (e.g., 1206, 1208, 1210, 1212, 1214, and 1216, etc.) and pre-discharge transistors (e.g., 1202, 1204, etc.) of the logic PMOS array 1202 each includes an NMOS transistor. More specifically, the logic PMOS transistors 1206, 1210, and 1214 are disposed along a 1$^{st}$ column of the array 1202 and are each coupled to the 1$^{st}$ column's BL 1201 at respective drain; the logic PMOS transistors 1208, 1212, and 1216 are disposed along a 2$^{nd}$ column of the array 1202 and are each coupled to the 2$^{nd}$ column's BL 1203 at respective drain. Further, each of logic PMOS transistors of the array 1202 is coupled to a voltage level 1241 (e.g., Vdd) at its respective source. Similar to the array 1102, in the array 1202, 1$^{st}$ row includes logic PMOS transistors 1206, 1208, etc., that are disposed along the 1$^{st}$ row and coupled to WL 1205; 2$^{nd}$ row includes logic PMOS transistors 1210, 1212, etc., that are disposed along the 2$^{nd}$ row and coupled to WL 1207; 3$^{rd}$ row includes logic PMOS transistors 1214, 1216, etc., that are disposed along the 3$^{rd}$ row and coupled to WL 1209. Each WL is configured to provide an assertion signal (e.g., 1213, 1215, etc.) to gates of coupled logic PMOS transistors so as to turn on one or more respective logic PMOS transistors. For example, the assertion signal 1213, provided by the WL 1205, may be used to turn on the logic PMOS transistors 1206 and 1208; the assertion signal 1215, provided by the WL 1207, may be used to turn on the logic PMOS transistors 1210 and 1212. Still similarly, the pre-discharge transistors 1202 and 1204 are concurrently controlled by a pre-discharge control signal 1211. Such pre-discharge control signal 1211 may be used to turn off the pre-discharge transistors 1202 and 1204 so as to provide one or more charging paths, which will be discussed in further detail below with respect to the operation of the logic PMOS array 1202 (FIG. 12B). Sense amplifier 1200 of authentication circuit 1240 are substantially similar to the sense amplifier 1100, and thus, the discussion of the sense amplifier 1200 is omitted.

In some embodiments, the operations of the logic PMOS array 1202 and the sense amplifier 1200 are substantially similar to the above-discussed operation with respect to FIG. 4B. Similarly, for the sense amplifier 1200 to generate an output bit 1219 based on the difference of charging rates, in some embodiments, the BL's 1201 and 1203 are first pre-discharged to ground. Then plural rows are sequentially selected so that each sense amplifier of the authentication circuit 1240 is allowed to compare the discharging rates present on respective BL's.

For example, the 1$^{st}$ row is selected at time "t1" by asserting the assertion signal 1213 to low. As such, the logic PMOS transistors (e.g., 1206, 1208, etc.) are turned on. In some embodiments, concurrently, at time t1, the pre-discharge control signal 1211 is asserted to low, which accordingly turns off the pre-discharge transistors 1202 and 1204. Consequently, charging paths 1226 and 1228 are formed from Vdd, through the logic PMOS transistor 1206, to the BL 1201, and from Vdd, through the logic PMOS transistor 1208, to the BL 1203, respectively, and as such, voltage levels present on the BL's 1201 and 1203 start to increase with respective charging rates, as shown in FIG. 12B. Once the difference between the voltages levels on the BL's 1201 and 1203 exceeds a pre-defined threshold (ΔV), at time "t2," enablement signal 1217 is triggered to high. Accordingly, a first output bit 1219 is generated by the sense amplifier 1200 for generating a PUF signature. Subsequently, the $2^{nd}$ row is selected at time "t3" by asserting the assertion signal 1215 to low, and following the above-described operation, at time "t4," a second output bit 1219 is generated by the sense amplifier 1200 for generating another PUF signature.

Referring now to FIG. 13A, the hybrid logic PMOS and NMOS array (hereinafter "hybrid array") 1302 is substantially similar to the logic NMOS array 1102 of FIG. 11A and logic PMOS array of FIG. 12A except that for each column of the hybrid array 1302, logic PMOS transistors and logic NMOS transistors are alternatively disposed therein and coupled to a respective BL. As shown, along BL 1301 of $1^{st}$ column of the hybrid array 1302, logic PMOS transistor 1306, logic NMOS transistor 1310, logic PMOS transistor 1314, and logic NMOS transistor 1318 are alternatively disposed along the $1^{st}$ column and coupled to the BL 1301; along BL 1303 of $2^{nd}$ column of the hybrid array 1302, logic PMOS transistor 1308, logic NMOS transistor 1312, logic PMOS transistor 1316, and logic NMOS transistor 1320 are alternatively disposed along the $2^{nd}$ column and coupled to the BL 1303. As such, along $1^{st}$ row, the logic PMOS transistors 1306 and 1308 are disposed therein and coupled to the row's WL 1305; along $2^{nd}$ row, the logic NMOS transistors 1310 and 1312 are disposed therein and coupled to the row's WL 1307; along $3^{rd}$ row, the logic PMOS transistors 1314 and 1316 are disposed therein and coupled to the row's WL 1309; along $4^{th}$ row, the logic PMOS transistors 1318 and 1320 are disposed therein and coupled to the row's WL 1311. Further, each of logic PMOS transistors of the hybrid array 1302 is coupled to a voltage level 1341 (e.g., Vdd) at its respective source and coupled to a BL at its respective drain; each of logic NMOS transistors of the hybrid array 1302 is coupled to a BL at its respective drain and a voltage level 1343 (e.g., ground) at its respective source.

Different from the arrays 1102 of FIG. 11A and 1202 of FIG. 12A, the hybrid array 1302, as shown in FIG. 13A, does not include the pre-charge and pre-discharge transistors. Sense amplifier 1300 of authentication circuit 1340 are substantially similar to the sense amplifier 1100/1200, and thus, the discussion of the sense amplifier 1300 is omitted.

Figure 13B:
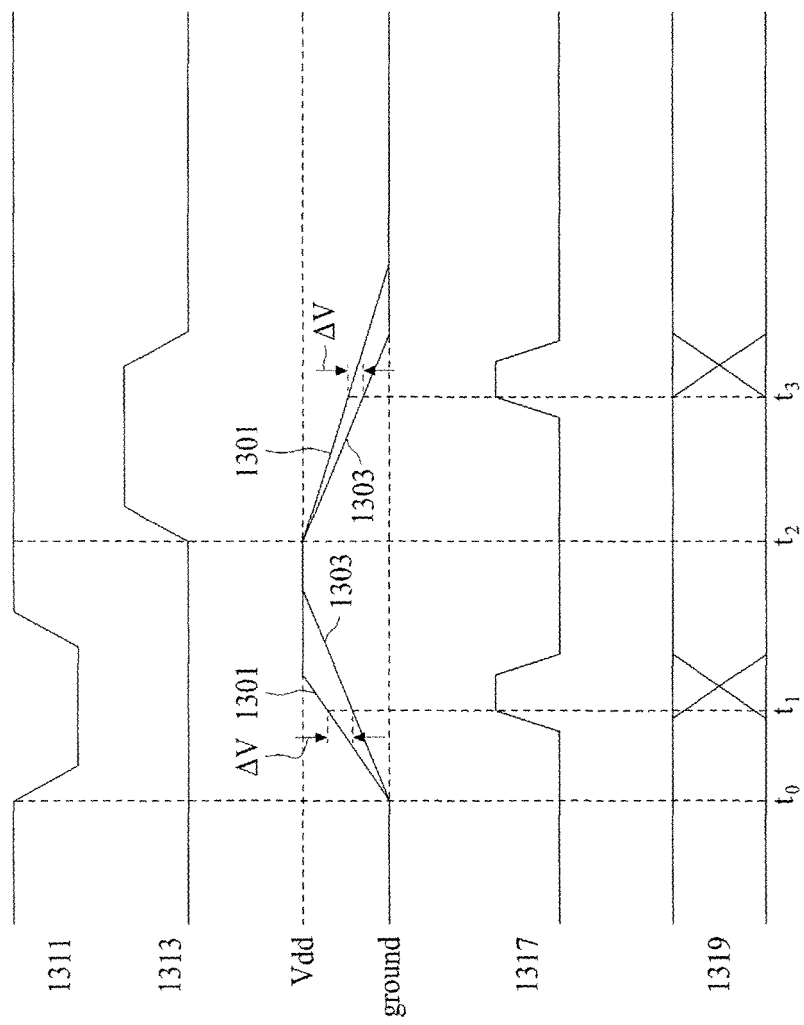
FIG. 13B is an exemplary diagram illustrating waveforms of signals of the hybrid logic PMOS and NMOS array and the sense amplifier of FIG. 13A, in accordance with some embodiments.

In some embodiments, operations of the hybrid array 1302 and coupled sense amplifier 1300 (authentication circuit 1340) are substantially similar to the operations described above (e.g., operations with respect to FIGS. 4A, 4B, 11B, and 12B). Thus, the operations of the operations of the hybrid array 1302 and coupled sense amplifier 1300 (authentication circuit 1340) are briefly described with respect to FIG. 13B. As shown, assertion signal 1311 is asserted to low so as to turn on the logic PMOS transistors (1306, 1308, etc.) along the $1^{st}$ row. Similar to the above-described "charging paths," in some embodiments, in order to compare a difference between two charging paths, the BL's 1301 and 1303 are pre-discharged to ground. Accordingly, once the logic PMOS transistors 1306 and 1308 are turned on (with transistors along other rows being turned off), charging paths 1326 and 1328 are formed from Vdd, through the logic PMOS transistor 1306, to the BL 1301, and from Vdd, through the logic PMOS transistor 1308, to the BL 1303, respectively. Consequently, voltage levels present on the BL's 1301 and 1303 start to increase with respective charging rates, as shown in FIG. 13B. Once the difference between the voltages levels on the BL's 1301 and 1303 exceeds a pre-defined threshold (ΔV), enablement signal 1317 is triggered to high. Accordingly, a first output bit 1319 is generated by the sense amplifier 1300 for generating a PUF signature. Subsequently, assertion signal 1313 is asserted to high so as to turn on the logic NMOS transistors (1310, 1312, etc.) along the $2^{nd}$ row. Similar to the above-described "discharging paths," in some embodiments, in order to compare a difference between two discharging paths, the BL's 1301 and 1303 are pre-charged to Vdd. Accordingly, once the logic NMOS transistors 1310 and 1312 are turned on (with transistors along other rows being turned off), discharging paths 1346 and 1348 are formed from the BL 1301, through the logic NMOS transistor 1310, to ground, and from the BL 1303, through the logic NMOS transistor 1312, to ground, respectively, and as such, voltage levels present on the BL's 1301 and 1303 start to drop with respective discharging rates, as shown in FIG. 13B. Once the difference between the voltages levels on the BL's 1301 and 1303 exceeds the pre-defined threshold (ΔV), the enablement signal 1317 is again triggered to high. Accordingly, a second output bit 1119 is generated by the sense amplifier 1300 for generating a PUF signature.

In an embodiment, a memory device is disclosed. The memory device includes a memory cell array comprising a plurality of memory cells wherein each of the plurality of memory cells is configured to be in a data state, and a physically unclonable function (PUF) generator. The PUF generator further includes a first sense amplifier, coupled to the plurality of memory cells, wherein while the plurality of memory cells are being accessed, the first sense amplifier is configured to compare accessing speeds of first and second memory cells of the plurality of memory cells, and based on the comparison, provide a first output signal for generating a first PUF signature.

In another embodiment, a memory device includes a memory cell array comprising a plurality of memory cells wherein each of the plurality of memory cells is configured to be in a data state, and a physically unclonable function (PUF) generator. The PUF generator further includes a first sense amplifier, coupled to first and second memory cells of the plurality of memory cells, and a second sense amplifier, also coupled to the first and second memory cells of the plurality of memory cells. While the plurality of memory cells are being accessed, the first sense amplifier is configured to compare a first accessing speed of the first and second memory cells, the second sense amplifier is configured to compare a second accessing speed of the first and second memory cells, and based on the comparisons on the first and second accessing speeds, the first and second sense amplifiers are each configured to provide a first output signal and a second output signal for generating a PUF signature.

Yet in another embodiment, a memory device includes a memory cell array comprising a plurality of memory cells wherein each of the plurality of memory cells is configured to be in a data state, and a physically unclonable function (PUF) generator, coupled to the plurality of memory cells. The PUF generator further includes a first sense amplifier;

and a column decoder, coupled between the plurality of memory cells and the first sense amplifier, that comprises at least four switches wherein each of the switches is coupled to one of four columns of the memory cell array, wherein while the plurality of memory cells are being accessed, the column decoder is configured to assert two of the four switches so as to allow the first sense amplifier to compare accessing speeds of first and second memory cells of the plurality of memory cells that are coupled to the first sense amplifier through the asserted switches, and based on the comparison, provide an output signal for generating a PUF signature.

The foregoing outlines features of several embodiments so that those ordinary skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A memory device, comprising:
   a memory cell array comprising a plurality of memory cells wherein each of the plurality of memory cells is configured to be in a data state; and
   a physically unclonable function (PUF) generator, comprising:
      a first sense amplifier, coupled to the plurality of memory cells, wherein while the data states of the plurality of memory cells are being read by respective sense amplifiers different from the first sense amplifier, the first sense amplifier is configured to compare either respective discharging rates or respective charging rates of first and second memory cells of the plurality of memory cells, and based on a voltage difference according to the comparison, provide a first output signal for generating a first PUF signature, wherein the first and second memory cells are adjacent to each other.

2. The memory device of claim 1, wherein the first and second memory cells are arranged in a same row of the memory cell array and arranged in a first column and a second column of the memory cell array, respectively, and wherein the first and second columns are next to each other without additional column therebetween.

3. The memory device of claim 2, herein the first sense amplifier is coupled to a hit line of the first column and a bit line of the second column, and wherein the bit line of the first column is coupled to the first memory cell and the bit line of the second column is coupled to the second memory cell.

4. The memory device of claim 3, further comprising a pre-charge/pre-discharge (PC/PD) circuit that is coupled to the plurality of memory cells.

5. The memory device of claim 4, wherein when the data state is a logical 0, the PC/PD circuit is configured to pre-charge the bit lines of the first and second columns to a positive supply voltage before the data states of the first and second memory cells are read.

6. The memory device of claim 5, wherein when the data state is a logical 1, the PC/PD circuit is configured to pre-discharge the bit lines of the first and second columns to ground before the data states of the first and second memory cells are read.

7. The memory device of claim 5, wherein during the data states of the first and second memory cells are being read, the first and second cells are supplied with a voltage level that is lower than the positive supply voltage.

8. The memory device of claim 1, wherein the PUF generator further comprises:
   a second sense amplifier, coupled to the plurality of memory cells, wherein while the plurality of memory cells are being read by respective sense amplifiers different from the second sense amplifier, the second sense amplifier is configured to compare either respective discharging rates or respective charging rates of third and fourth memory cells of the plurality of memory cells that are adjacent to each other, and based on the comparison, provide a second output signal for generating the first PUF signature.

9. A memory device, comprising:
   a memory cell array comprising a plurality of memory cells wherein each of the plurality of memory cells is configured to be in a data state; and
   a physically unclonable function (PUF) generator, comprising:
      a first sense amplifier, coupled to first and second memory cells of the plurality of memory cells,
      a second sense amplifier, also coupled to the first and second memory cells of the plurality of memory cells,
   wherein while the data states of the plurality of memory cells are being read by respective sense amplifiers different from the first and second sense amplifiers, the first sense amplifier is configured to compare respective discharging rates of the first and second memory cells, the second sense amplifier is configured to compare respective charging rates of the first and second memory cells, and based on a first voltage difference according to the comparison on the discharging rates, the first amplifier is configured to provide a first output signal and based on a second voltage difference according to the comparison on the charging rates, the second sense amplifier is configured to provide a second output signal, and
   wherein the first and second output signals are used for generating a PUF signature, and wherein the first sense amplifier is coupled to a bit line of a first column and a bit line of a second column, wherein the second sense amplifier is coupled to a bit bar line of the first column and a bit bar line of the second column, and wherein the bit line and the bit bar line of the first column is coupled to the first memory cell and the bit line and the bit bar line of the second column is coupled to the second memory cell.

10. The memory device of claim 9, wherein the first and second memory cells are arranged in a same row of the memory cell array and arranged in the first column and the second column of the memory cell array, respectively, and wherein the first and second columns are next to each other without an additional column therebetween.

11. The memory device of claim 9, further comprising a pre-charge/pre-discharge (PC/PD) circuit that is coupled to the plurality of memory cells.

12. The memory device of claim 11, wherein when the data state is a logical 0, the PC/PD circuit is configured to pre-charge the bit lines of the first and second columns to a positive supply voltage before the data states of the first and second memory cells are read, and pre-discharge the bit bar lines of the first and second columns to ground before the data states of the first and second memory cells are read.

13. The memory device of claim 11, wherein when the data state is a logical 1, the PC/PD circuit is configured to pre-discharge the bit lines of the first and second columns to ground before the data states of the first and second memory cells are read, and pre-charge the hit bar lines of the first and second columns to the positive supply voltage before the data states of the first and second memory cells are read.

14. The memory device of claim 12, wherein during the data states of the first and second memory cells are being read, the first and second cells are supplied with a voltage level that is lower than positive supply voltage.

15. A memory device, comprising:
- a memory cell array comprising a plurality of memory cells wherein each of the plurality of memory cells is configured to be in a data state;
- a physically unclonable function (PUF) generator, coupled to the plurality of memory cells, that comprises:
  - a first sense amplifier; and
  - a column decoder, coupled between the plurality of memory cells and the first sense amplifier, that comprises at least four switches wherein each of the switches is coupled to one of four columns of the memory cell array, wherein while the data states of the plurality of memory cells are being read, the column decoder is configured to assert two of the four switches so as to allow the first sense amplifier to compare either respective discharging rates or respective charging rates of first and second memory cells of the plurality of memory cells that are coupled to the first sense amplifier through the asserted switches, and based on a voltage difference according to the comparison, provide an output signal for generating a PUF signature, wherein each column of the memory cell array includes a bit line and a bit bar line, and the switch of the column decoder is coupled to either a bit line or a bit bar line of one of the columns of the memory cell array.

16. The memory device of claim 15, wherein during the data states of the first and second memory cells are being read, the first and second cells are supplied with a voltage level that is lower than a positive supply voltage.

* * * * *

UNITED STATES PATENT AND TRADEMARK OFFICE
CERTIFICATE OF CORRECTION

PATENT NO. : 10,153,035 B2
APPLICATION NO. : 15/288342
DATED : December 11, 2018
INVENTOR(S) : Chien-Chen Lin et al.

It is certified that error appears in the above-identified patent and that said Letters Patent is hereby corrected as shown below:

In the Claims

Claim 3, Column 25, Line 52, delete "herein" and insert -- wherein --

Claim 3, Column 25, Line 53, delete "hit" and insert -- bit --

Claim 13, Column 27, Line 8, delete "hit" and insert -- bit --

Signed and Sealed this
Fifteenth Day of January, 2019

Andrei Iancu
*Director of the United States Patent and Trademark Office*